US011599091B2

(12) United States Patent
Edsinger et al.

(10) Patent No.: US 11,599,091 B2
(45) Date of Patent: Mar. 7, 2023

(54) TELESCOPIC STRUCTURE ACTUATION

(71) Applicant: Hello Robot, Martinez, CA (US)

(72) Inventors: Aaron Edsinger, Martinez, CA (US); Charles Kemp, Atlanta, GA (US)

(73) Assignee: Hello Robot, Martinez, CA (US)

( * ) Notice: Subject to any disclaimer, the term of this patent is extended or adjusted under 35 U.S.C. 154(b) by 124 days.

(21) Appl. No.: 17/112,406

(22) Filed: Dec. 4, 2020

(65) Prior Publication Data

US 2021/0173381 A1 Jun. 10, 2021

Related U.S. Application Data

(60) Provisional application No. 62/944,891, filed on Dec. 6, 2019.

(51) Int. Cl.
*G05B 19/4155* (2006.01)
*F16H 19/06* (2006.01)

(52) U.S. Cl.
CPC ......... *G05B 19/4155* (2013.01); *F16H 19/06* (2013.01); *F16H 19/0645* (2013.01);
(Continued)

(58) Field of Classification Search
CPC ...... G05B 19/4155; G05B 2219/45179; F16H 2019/0686; F16H 19/0663; F16H 19/0645; F16H 19/06
See application file for complete search history.

(56) References Cited

U.S. PATENT DOCUMENTS 2,131,261 A * 9/1938 Aldeen ............... F16H 19/0645
254/95
3,472,085 A * 10/1969 Rosen ..................... F16H 49/00
74/89.2

(Continued)

FOREIGN PATENT DOCUMENTS

CN 106882723 A 6/2017
DE 3315779 A1 11/1984
(Continued)

OTHER PUBLICATIONS

Partial International Search and Invitation to Pay Additional Fees received for PCT Application No. PCT/US2020/63400, dated Mar. 16, 2021, 127 pages.

*Primary Examiner* — David M Fenstermacher
(74) *Attorney, Agent, or Firm* — Mintz Levin Cohn Ferris Glovsky and Popeo, P.C.

(57) ABSTRACT

Actuation systems and methods for actuating a telescopic structure are provided. The actuation system can include a chain cartridge including a drive chain engageably coupled to a drive mechanism actuated by an actuator coupled to a power supply. The drive chain can include a plurality of inter-connected links conveying at least one cable within an interior space of each inter-connected link. The system can also include a telescopic structure including a plurality of segments configured to extend and retract telescopically and conveying the drive chain therein. The drive chain can couple to a distal segment of the plurality of segments. The drive mechanism can impart a linear translation force on the plurality of inter-connected links to cause the distal segment to extend or retract from the telescopic structure. Methods of actuating the actuation system described herein are also provided.

30 Claims, 25 Drawing Sheets

(52) U.S. Cl.
CPC . *F16H 19/0663* (2013.01); *F16H 2019/0686* (2013.01); *G05B 2219/45179* (2013.01)

(56) References Cited

U.S. PATENT DOCUMENTS

| | | | | |
|---|---|---|---|---|
| 3,672,237 | A * | 6/1972 | Nagin | F16G 13/06 198/618 |
| 4,615,234 | A * | 10/1986 | Chevance | B60J 1/17 74/506 |
| 4,735,563 | A * | 4/1988 | Tanaka | B29C 45/531 425/127 |
| 4,819,495 | A * | 4/1989 | Hormann | F16H 19/0636 74/424.78 |
| RE33,020 | E * | 8/1989 | Yokote | B60R 22/06 242/390.3 |
| 5,006,097 | A * | 4/1991 | Cook | E06B 9/32 474/154 |
| 5,271,182 | A * | 12/1993 | Greisner | E05F 15/619 49/325 |
| 6,224,037 | B1 * | 5/2001 | Novick | F16G 13/20 254/95 |
| 8,069,954 | B2 * | 12/2011 | Kempf | B66F 13/005 254/133 R |
| 8,925,405 | B2 * | 1/2015 | Kawabuchi | B25J 9/045 74/37 |
| 9,833,911 | B2 * | 12/2017 | Yoon | B25J 18/025 |
| 10,907,706 | B2 * | 2/2021 | Cai | F16H 19/0663 |
| 2006/0280587 | A1 | 12/2006 | Guerra et al. | |
| 2011/0163151 | A1 | 7/2011 | Larsson | |
| 2011/0225903 | A1 * | 9/2011 | Lounis | F16M 11/18 248/188.5 |
| 2011/0308338 | A1 * | 12/2011 | Schluckebier | F16H 19/0645 74/89.2 |
| 2014/0216199 | A1 * | 8/2014 | Maltby | F16H 51/02 74/522 |
| 2015/0337929 | A1 * | 11/2015 | Hartinger | F16H 19/0645 74/89.21 |
| 2019/0331204 | A1 * | 10/2019 | Cai | F16H 19/0663 |

FOREIGN PATENT DOCUMENTS

| | | |
|---|---|---|
| EP | 2766620 A1 | 8/2014 |
| WO | 2013053748 A1 | 4/2013 |

* cited by examiner

TELESCOPIC STRUCTURE ACTUATION

CROSS REFERENCE TO RELATED APPLICATIONS

This application claims the benefit of and priority to U.S. Provisional Patent Application No. 62/944,891, filed on Dec. 6, 2019 and entitled "METHOD FOR ACTUATING A TELESCOPING MECHANISM FOR A ROBOT". The entire contents of which is hereby expressly incorporated by reference herein.

BACKGROUND

Actuation of a telescopic structure can be required in a variety of environments and/or applications to perform an objective task using the telescopic structure. Often actuation systems configured to actuate a telescopic structure include expensive, large, and complex designs which can be limited in their ability to sense interaction forces in the environment. Traditional actuation systems are usually complex, heavy, and large compared to the objective tasks to be performed. In addition, traditional actuation systems often do not include efficient gear trains, which can require complex sensor and processing architectures to determine actuation forces and contact sensitivity based on received interaction forces experienced in application environments.

Personal, assistive robots can include complicated articulation and actuation systems, which can cause such robots to be expensive and difficult to use. As a result, such robots may be financially unattainable for users needing assistive robotic devices and may create a reduced user experience when performing objective tasks. Such robots may be large and heavy due to the complicated articulation, which can limit its ability to provide assistive articulation when accessing, reaching, or otherwise interacting with objects in a particular environment.

Accordingly, there is a need for actuations systems configured to actuate a telescopic structure in a mobile, assistive robot that can support articulation in multiple degrees of freedom. Benefits of such actuation systems can include lower component and manufacturing costs, less complicated designs, ease of deployment in a wider variety of environments, and increased user experience when performing objective tasks.

SUMMARY

Traditional actuation systems often include a series of revolute actuated joints configured to provide articulated reach of a robot arm across a workspace. Each actuated joint must support against gravity the full weight of the structure's distal joints, causing a compounding effect where the proximal joints of the actuation system become large, expensive, and unsafe to actuate around people. A telescopic structure that extends horizontally is self-supporting against gravity and therefore uses much smaller, lower cost, and safer actuators to achieve a comparable reach. In addition, having a slender cross section allows it to reach into cluttered environments not accessible to robot arms that employ traditional actuation system.

The actuation system described herein can provide actuation of a telescopic structure included in a mobile, assistive robot or in non-robotic application. The actuation system provided can achieve articulation through a greater number of degrees of freedom and with greater accuracy of exerted actuation forces compared to traditional actuation systems. As a result, the actuation system described here can provide more robust performance completing user-defined tasks.

In general, systems and methods are provided for actuating a telescopic structure. In one aspect, an actuation system for actuating a telescopic structure is provided. In one embodiment, the actuation system can include a first chain cartridge including a drive chain engageably coupled to a drive mechanism actuated by a first actuator coupled to a power supply. The drive chain can include a first plurality of inter-connected links conveying at least one first cable within a first interior space of each of the first plurality of inter-connected links. The actuation system can also include a telescopic structure including a plurality of segments configured to extend and retract telescopically with respect to one another and conveying the drive chain therein. A first end of the drive chain can be coupled to a distal segment of the plurality of segments. The distal segment can be located at a first end of the telescopic structure. The drive mechanism can impart a linear translation force on the first plurality of interconnected links to cause the distal segment to extend from or retract into the first end of the telescopic structure.

In another embodiment, rotation of the drive mechanism in a first direction can cause the drive chain to extend from within the first chain cartridge so as to actuate an extension of the telescopic structure and rotation of the drive mechanism in a second direction can cause the drive chain to retract into the first chain cartridge so as to cause a retraction of the telescopic structure. In another embodiment, the at least one first cable can include a data cable, a power cable, or a pneumatic line.

In another embodiment, the first chain cartridge can be a self-spooling chain cartridge including a passively rotating pinion coupled to a second end of the drive chain and one or more curved guide tracks formed on an internal surface of the self-spooling chain cartridge. Motion of the drive mechanism can cause the drive chain to spool into and unspool from the first chain cartridge. The passively rotating pinion can be affixed to the internal surface of the self-spooling chain cartridge via a retaining element and includes a slot where the first plurality of cables exit the self-spooling chain cartridge.

In another embodiment, the actuation system can be coupled to a base of a mobile robot. The actuation system can further include a mast attached to the base of the mobile robot and a lift carriage coupled to the mast. The lift carriage can include a plurality of lift carriage rollers. The lift carriage and the telescoping structure can translate vertically on the mast. In another embodiment, the actuation system can further include a second actuator in the base. The second actuator can be coupled to the lift carriage via at least one of a timing belt, a roller chain, or a flexible drive element. The second actuator can impart vertical motion on the lift carriage. In another embodiment, the actuation system can further include a second chain cartridge in the base. The second chain cartridge can include a drag chain including a second plurality of inter-connected links coupled to the lift carriage and conveying at least one second cable within a second interior space of each of the second plurality of inter-connected links. Vertical motion of the lift carriage can cause the drag chain to spool into and unspool from the second chain cartridge.

In another embodiment, the at least one second cable can include a data cable, a power cable, or a pneumatic line. In another embodiment, the mast can include a channel guiding the drag chain linearly within the mast and a keeper retaining the drag chain in a rigid linear arrangement within the channel during retraction into or extension from the second chain cartridge. The keeper can include at least one of a brush wiper, a rubber gland, a compliant flap or seal, a spool of metal tape, or a flexible drive element of the lift carriage.

In another embodiment, the first actuator and first chain cartridge can be located remotely from the drive mechanism in the base of the mobile robot. The first actuator can be coupled to the drive mechanism via a drive transmission. In another embodiment, the drive transmission can include a differential transmission including a first differential drive belt coupling the first actuator to the drive mechanism and a second differential drive belt coupling the second actuator to the drive mechanism. Concurrent motion of the first differential drive belt and the second differential drive belt in a first direction or a second direction can cause the lift carriage to translate vertically on the mast. Motion of the first differential drive belt in the first direction occurring concurrently with motion of the second differential drive belt in the second direction can cause the telescopic structure to translate horizontally relative to a surface on which the base of the mobile robot is located. The first direction can be opposite the second direction.

In another embodiment, the drive transmission can include a rotary shaft transmission including a rotary drive shaft and a right-angled gear box coupling the first actuator to the drive shaft. The right-angled gear box can travel along the rotary drive shaft as the lift carriage travels vertically on the mast.

In another embodiment, the drive mechanism can include a drive chain guide retaining the drive chain radially with respect to the drive mechanism. In another embodiment, the distal segment of the telescopic structure can be coupled to at least one manipulator payload, wherein the at least one manipulator payload includes a sensor, a tool, or a third actuator, and wherein the at least one first cable couples to the manipulator payload.

In another embodiment, the first actuator can be coupled to the drive mechanism via at least one of a timing belt, differential belt, a coupled belt, a gearbox, a spur gear, or a chain drive. In another embodiment, the drive chain can be engageably coupled to the drive mechanism via a plurality of engagement features of the drive mechanism. The plurality of engagement features can include at least one of a plurality of tooth engagement features, a plurality of cog engagement features, or a plurality of friction rollers.

In another embodiment, each segment of the plurality of segments can include a rectangular-shaped cross-section, a curved-shaped cross-section, or a triangular-shaped cross-section. The plurality of segments can be injection molded plastic segments, carbon fiber segments, extruded aluminum segments, or ultrasonically welded plastic segments. In another embodiment, each segment of plurality of segments of the telescopic structure can include a first plurality of rollers coupled to an outer cuff of each segment and a second plurality of rollers coupled to an inner cuff of each segment. The outer cuff can be located opposite the inner cuff.

In another embodiment, the inner cuff of each segment can include a drive chain guide inserted into the inner cuff. The drive chain guide can include an opening configured to align the first plurality of inter-connected links within the plurality of segments in parallel with a telescopic axis of the telescopic structure along which the plurality of segments telescopically travel. In another embodiment, a first segment of the plurality of segments of the telescopic structure can include an extension limiter preventing hyperextension of the first segment with respect to a second segment. The first segment can be configured to extend from within the second segment.

In another aspect, a method for actuating an actuation system is provided. In one embodiment, the method can include receiving, by a data processor of an actuation system, a first input corresponding to an interaction force exerted upon at least one segment of a plurality of segments of a telescopic structure of the actuation system. The first input can include a first current value supplied to a first actuator of the actuation system at a time the interaction force was exerted on the at least one segment. The method can also include receiving, by the data processor, a second input associated with a maximum interaction force of the at least one segment. The second input can include a second current value. The method can further include receiving, by the data processor, a third input associated with an actuation force to be exerted by the at least one segment. The third input can include a third current value. The method can also include determining, by the data processor, an actuation signal including a fourth current value less than the second current value and less than or equal to the third current value. The fourth current value can cause the first actuator to actuate the at least one segment to exert the actuation force. The method can further include providing, by the data processor, the actuation signal to the first actuator.

In another embodiment, the first current value can be received from a winding current sensor of the first actuator. In another embodiment, the interaction force can be received by a force sensor attached to the telescopic structure. In another embodiment, the method can also include operating the first actuator based on the actuation signal.

In another embodiment, the method can also include receiving, by the data processor, a fourth input corresponding to a first length of the telescopic structure at the time the interaction force was exerted upon the at least one segment. The method can further include receiving, by the data processor, a fifth input corresponding to a second length of the telescopic structure associated with an objective length of the telescopic structure. The method can also include determining an updated third current value based on the fourth input and the fifth input. The updated third current value can cause the first actuator to actuate the telescopic structure to achieve the second length.

In another embodiment, the fifth input can be received programmatically or as a user-provided input. In another embodiment, the first length and the second length can be determined via an encoder coupled to the first actuator. In another embodiment, the actuation signal can cause a drive mechanism coupled to the first actuator to rotate in a first direction extending the at least one segment or in a second direction retracting the at least one segment. The second direction can be opposite the first direction. In another embodiment, the second input can be received programmatically or as a user-provided input.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which.

Figure 1:
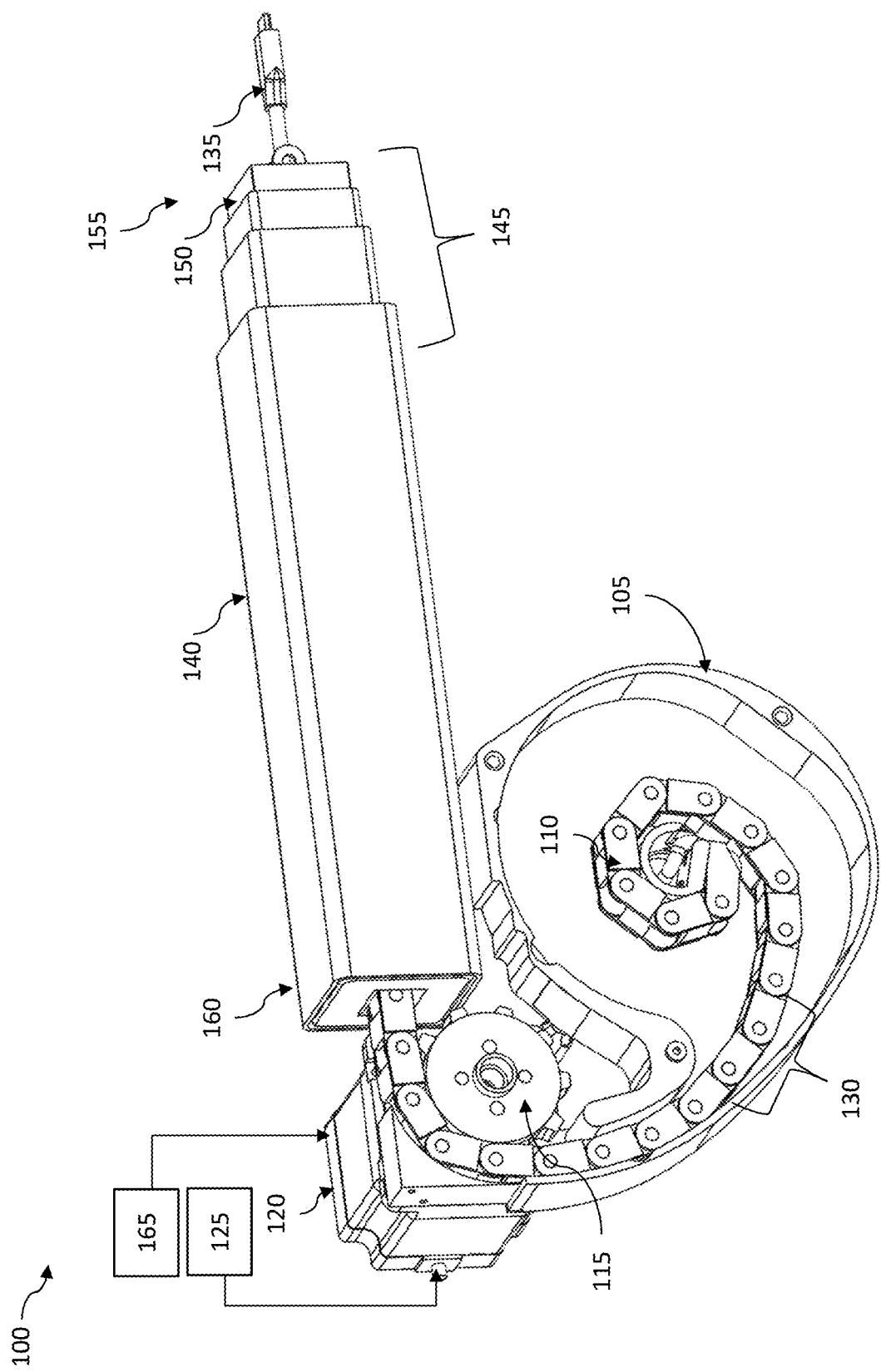
FIG. 1 is a diagram illustrating an exemplary embodiment of an actuation system configured to actuate a telescopic structure as described herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

The actuation system described herein can actuate a telescopic structure to extend or retract in regard to an objective task or interaction forces exerted upon the telescopic structure. The telescopic structure can be actuated horizontally for use as a manipulator and can additionally be actuated to travel vertically along a vertical structure, such as a mast. The actuation system can also include a drive chain including multiple inter-connected links conveying data, power, and/or pneumatic cables or lines therein to a distal end of the telescopic structure. The inter-connected links can flex in one direction and can form a rigid arrangement when an actuation force is applied to the drive chain in a different direction. The actuation system can also include a chain cartridge from which the drive chain can extend from or retract into.

The drive chain can be coupled to a drive mechanism of an actuation source, such as an actuator or a motor. The drive chain can be coupled to the actuator via a drive transmission, which can enable simultaneous or independent actuation of the telescopic structure and vertical travel of the telescopic structure along the vertical structure or mast. In this way, the actuation system can access or reach a larger range of target locations associated with an objective task.

The drive chain can carry within it electrical (e.g., power and data) cables and pneumatic lines to the distal end of the telescopic structure. In traditional robot arms, the routing of these cables through revolute joints to the end of the arm is a significant source of complexity and component failure. In the actuation system described herein, the drive chain configuration provides a simple, compact, and robust solution over the traditional systems.

The telescopic structure can be oriented to reach horizontally. As such, the actuator does not have to support static gravitational loads. This allows the actuator to be small and to not require a high ratio gearbox as is often required in traditional actuator systems. By employing a small motor with a low gear ratio gearbox, the effective inertia of the actuation system is kept low. This has the advantage of allowing the winding current of the actuator to be a good approximation of the forces that the telescopic structure applies to the environment. By being sensitive to interaction forces the telescopic structure can be controlled to react safely around people.

Embodiments of actuation system and corresponding methods for actuating a telescopic structure of an actuation system configured within a mobile robot are discussed herein. However, embodiments of the disclosure can be employed to actuate telescopic structures in stationary or mobile applications which do not include a robot without limit.

FIG. 1 is a diagram illustrating an exemplary embodiment of an actuation system 100 configured to actuate a telescopic structure as described herein. As shown in FIG. 1, the actuation system 100 can include a chain cartridge 105. The chain cartridge 105 can include therein a drive chain 110. The drive chain 110 can be coupled to a drive mechanism 115. The drive mechanism 115 can be coupled to and actuated by an actuator 120 powered by a power supply 125. The power supply 125 can include a rechargeable power supply or a non-rechargeable power supply. The drive chain 110 can be formed from and include inter-connected links 130. The inter-connected links 130 can include an open interior space within each inter-connected link to allow one or more cables 135 to be conveyed therein.

As further shown in FIG. 1, the actuation system 100 can also include a telescopic structure 140 including two or more segments 145. The segments 145 can be configured to extend from and retract into one another to provide horizontal extension and retraction of the telescopic structure 140. The telescopic structure 140 can convey the drive chain 110 within the segments 145. The drive chain 110 can coupled to the distal segment 150 located at a distal end 155 of the telescopic structure 140. The distal end 155 of the telescopic structure 140 can be opposite the proximal end 160 of the telescopic structure 140. The drive chain 110 can be initially received within the telescopic structure 140 at the proximal end 160 and can couple to a proximal end of the distal segment 150.

In operation, the actuation system 100 can actuate to extend or retract the telescopic structure 140. Upon receiving an actuation signal from a controller 165 coupled to the actuator 120, the actuator 120 can actuate the drive mechanism 115. The drive mechanism 115 can rotate in two directions. In a first direction, the drive mechanism 115 can rotate to cause the drive chain 110 to exit the chain cartridge 105 and to pass into the telescopic structure 140 at the proximal end 160. Rotation in this first direction can cause the drive chain 110 to exert a linear translation force on the distal segment 150 to cause the segments 145 to extend from within one another. In a second direction, opposite to the first direction, the drive mechanism 115 can rotate to cause the drive chain 110 to return into the chain cartridge 110 and to exit the telescopic structure 140 at the proximal end 160.

Figure 2:
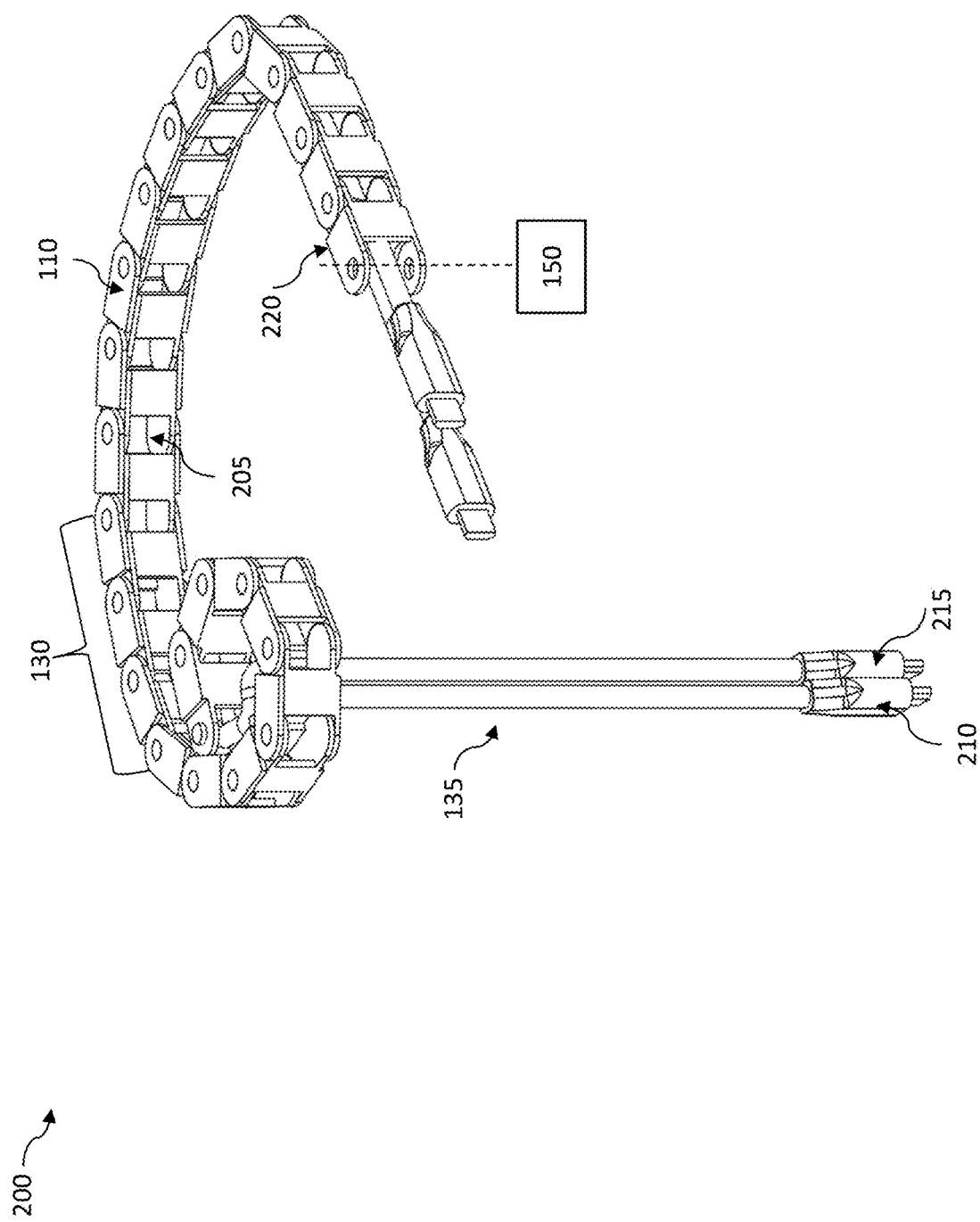
FIG. 2 is a diagram illustrating an exemplary embodiment of a drive chain of the actuation system as described herein.

FIG. 2 is a diagram illustrating an exemplary embodiment 200 of a drive chain 110 of the actuation system 100 as described herein. The drive chain 110 shown in FIG. 2 can be formed from a plurality of inter-connected links 130. Each link can include an open interior space 205 through which one or more cables or lines 135 can pass. In some embodiments, the cables/lines 135 can include a data cable, a power cable, and/or a pneumatic line supplying data, power, or pneumatic force, respectively, to a manipulation payload coupled to the distal segment 150. As shown in FIG. 2, a first cable/line 210 and a second cable/line 215 can be configured within the drive chain 110. The distal end 220 of the drive chain 110 can be coupled to the distal segment 150 of the telescopic structure 140 shown in FIG. 1. This connection is illustrated in FIG. 2 via the dashed line connecting the distal end 220 of the drive chain 110 to the distal segment 150.

Figure 3:
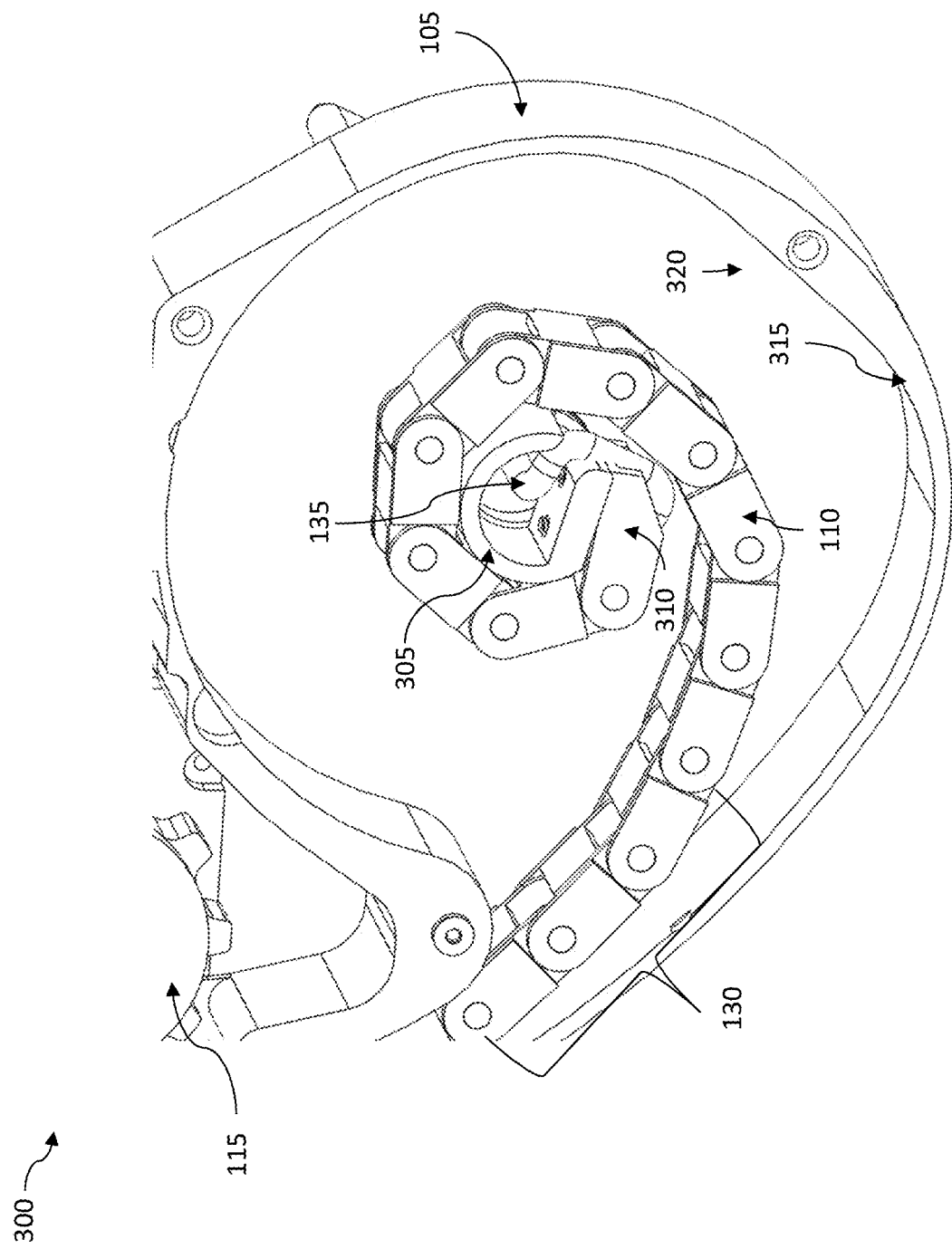
FIG. 3 is a diagram illustrating an exemplary embodiment of a chain cartridge of the actuation system as described herein.

FIG. 3 is a diagram illustrating an exemplary embodiment 300 of a chain cartridge 105 of the actuation system 100 as described herein. As shown in FIG. 3, the chain cartridge 105 can be a self-spooling chain cartridge. The self-guided chain cartridge can include a passively rotating pinion 305 configured to receive a proximal end 310 of the drive chain 110. The self-guided chain cartridge can include one or more curved guide tracks 315 formed on an internal surface 320 of the self-guided chain cartridge 105. As shown in FIG. 3, the one or more cables/lines 135 can exist the chain cartridge 105 via a slot or opening in the passively rotating pinion 305. In some embodiments, the one or more cables/lines 135 can include a service loop or coiling mechanism to reduce damage to or excessive twisting of the cables/lines 135 as the passively rotating pinion 305 rotates.

In operation, the drive chain 110 is withdrawn from within the chain cartridge 105 as the actuator 120 actuates the drive mechanism 115 in a first direction causing the drive chain 110 to form a rigid configuration of the inter-connected links 130 and to extend from within the chain cartridge 105. Conversely, as the drive chain 110 is pushed into the chain cartridge 105 due to rotation of the drive mechanism 115 in a second direction (opposite to the first direction), the drive chain 110 can form a rigid configuration of the inter-connected links 130 causing the passively rotating pinion 305 to rotate. The curved guide tracks 315 can act with rotation of the pinion 305 in response to the drive mechanism 115 rotation imparting a linear translation force on the inter-connected links 130 to cause the drive chain 110 to coil upon itself within the chain cartridge 105.

In some embodiments, the chain cartridge 105 can be a guided cartridge including one or more spiral shaped tracks for the drive chain 110 to slide into. The spiral shaped tracks can include a smooth surface formed from spring steel or plastic. In this embodiment, the proximal end 310 of the drive chain 110 is not affixed to the chain cartridge 105 and is free to travel within the spiral shaped tracks during extension or retraction of the drive chain 110 relative to the chain cartridge 105.

Figure 4:
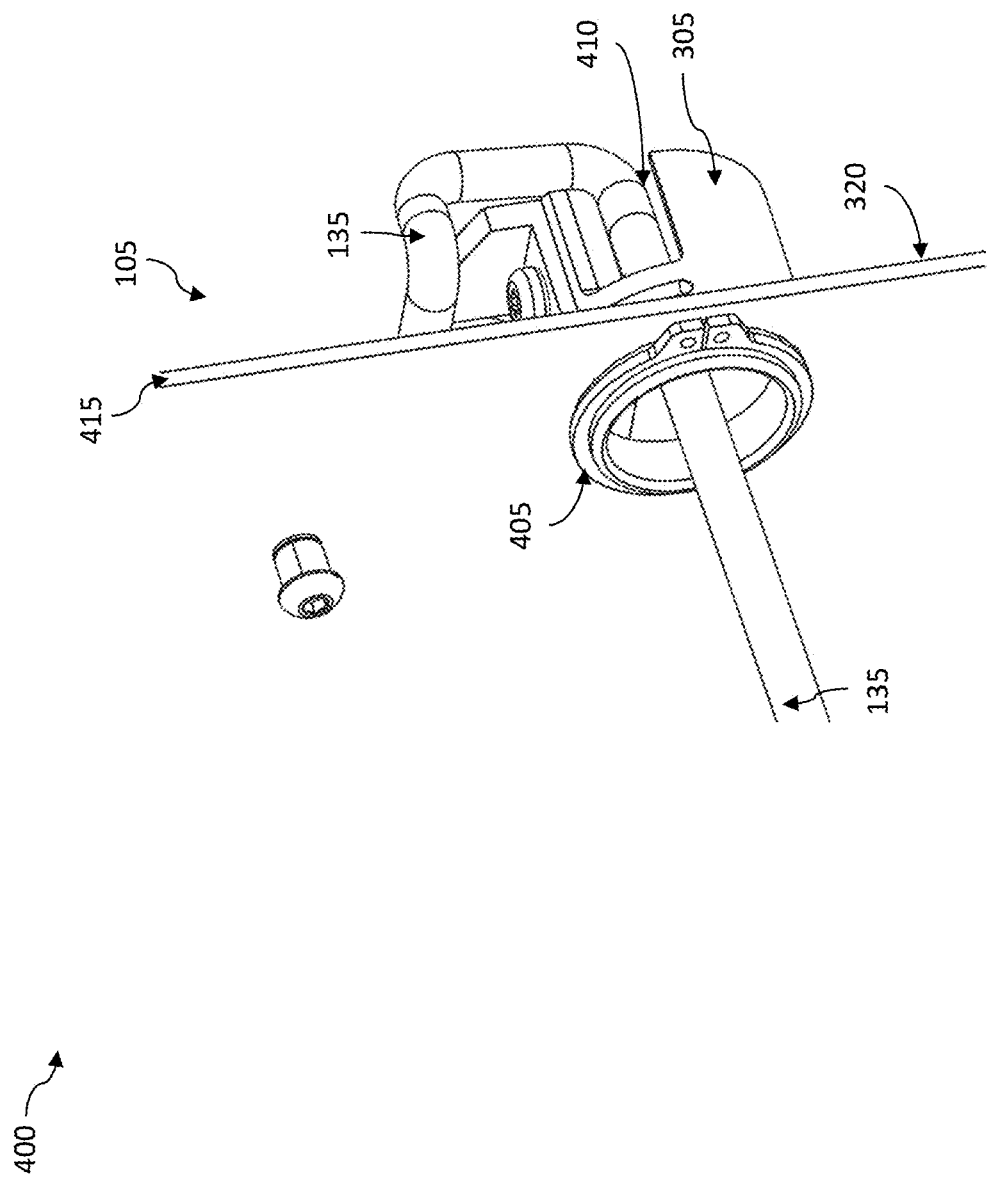
FIG. 4 is a diagram illustrating another exemplary embodiment of the chain cartridge of the actuation system as described herein.

FIG. 4 is a diagram illustrating another exemplary embodiment 400 of the chain cartridge 105 of the actuation system 100 as described herein. As shown in FIG. 4, a cut-away view of the chain cartridge 105 is provided. The passively rotating pinion 305 can be affixed to the internal surface 320 of the chain cartridge 105 via a fixed pin or a retaining element 405. The passively rotating pinion 305 can include a slot 410 through which the one or more cables/lines 135 can pass from through a wall 415 of the chain cartridge 105.

Figure 5:
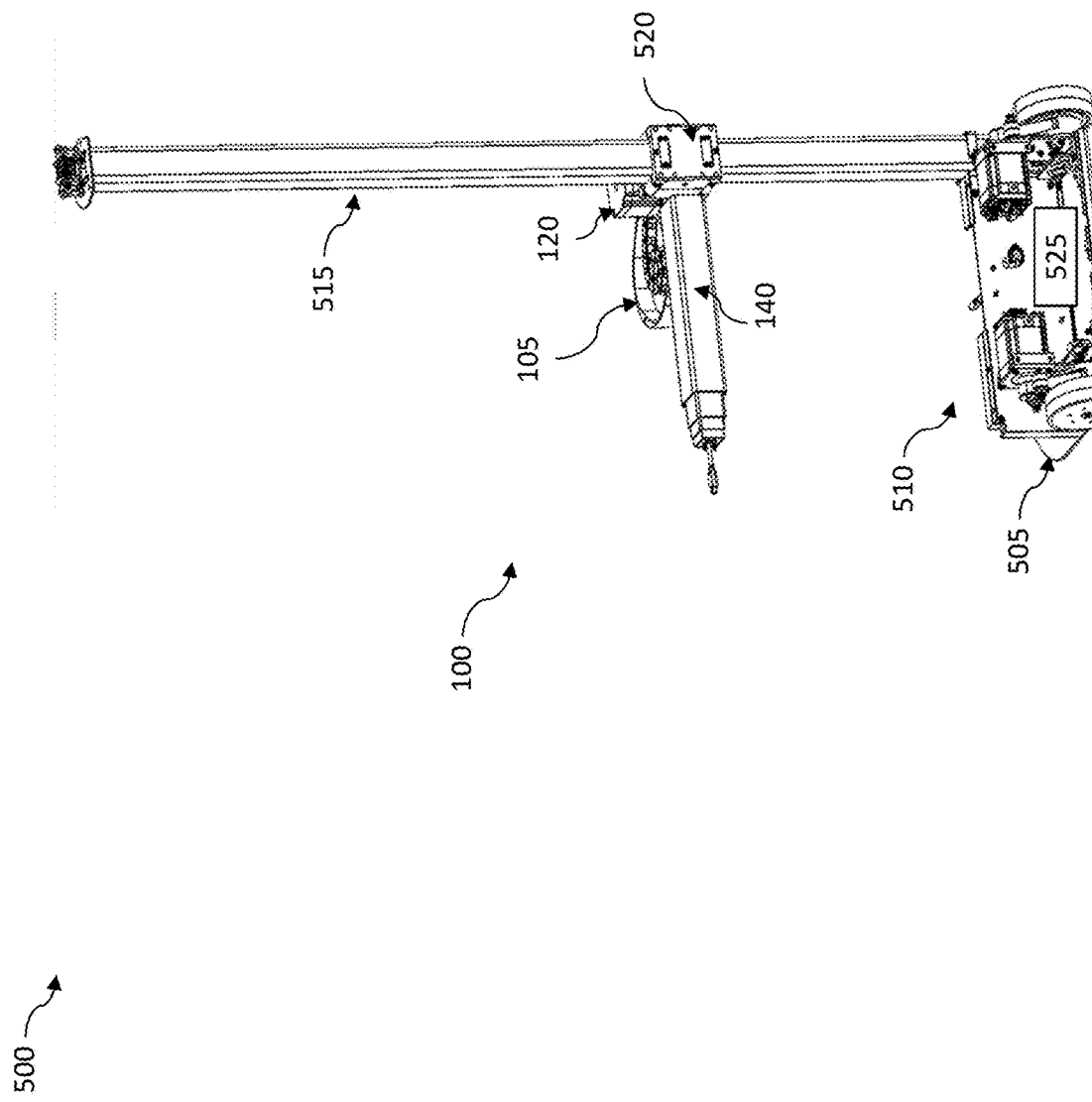
FIG. 5 is a diagram illustrating an exemplary embodiment of the actuation system coupled to a base of a mobile robot as described herein.

FIG. 5 is a diagram illustrating an exemplary embodiment 500 of the actuation system 100 coupled to a base of a mobile robot as described herein. As shown in FIG. 5, the actuation system 100 shown and described in relation to FIGS. 1-4 can be coupled to a base 505 of a mobile robot 510. In this embodiment, the actuation system 100 can further include a vertical mast 515 attached to the base 505 of the mobile robot 510 and a lift carriage 520. The chain cartridge 105, actuator 120, and telescopic structure 140 can be attached to the mast 515 via the lift carriage 520. The lift carriage 520 can translate the chain cartridge 105, actuator 120, and telescopic structure 140 vertically along the mast 515. A power supply 525 can be included in the base 505 and can be coupled to the actuator 120.

Figure 6:
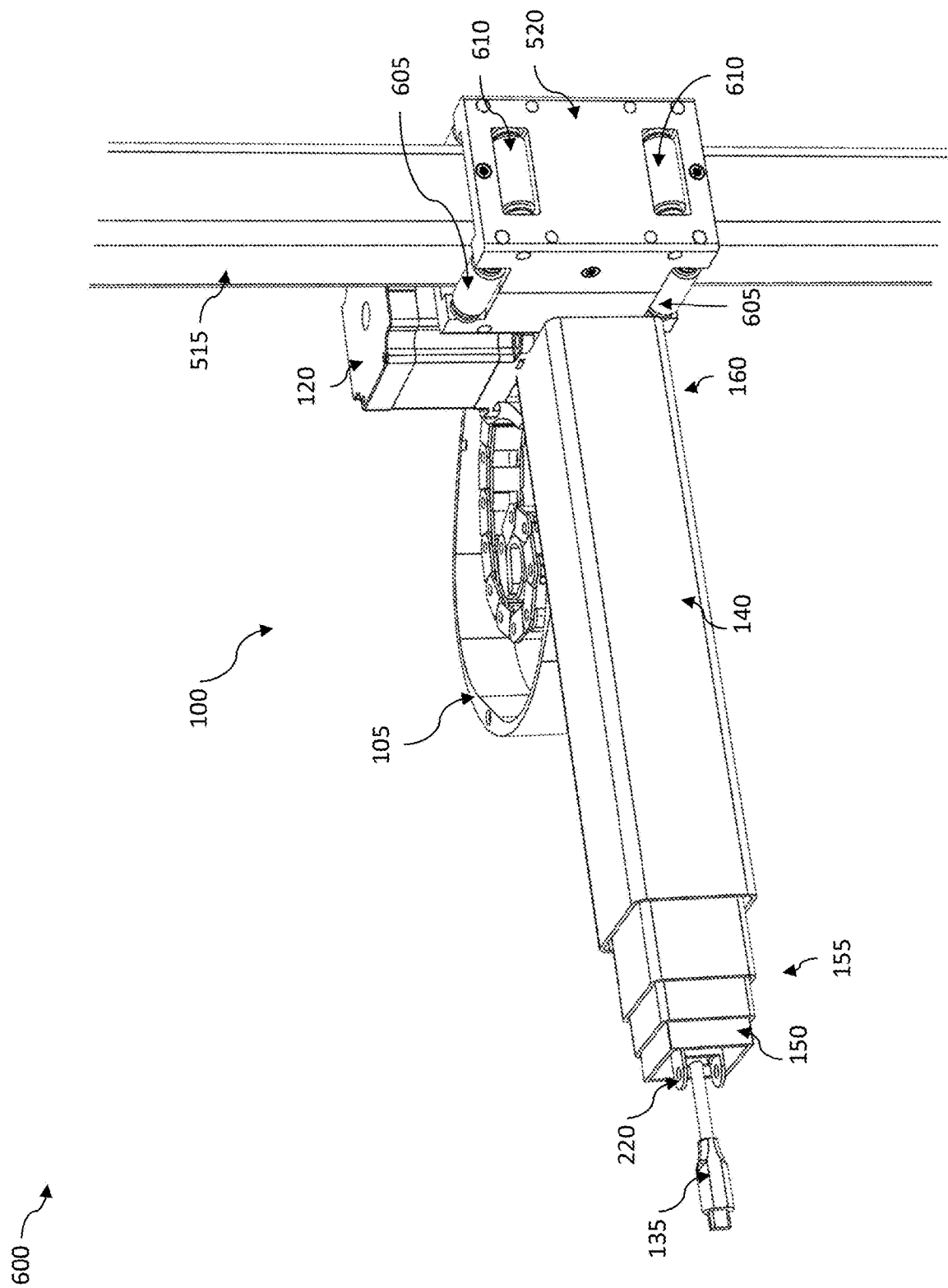
FIG. 6 is a diagram illustrating an exemplary embodiment of a lift carriage of the actuation system as described herein.

FIG. 6 is a diagram illustrating an exemplary embodiment 600 of a lift carriage 520 of the actuation system 100 as described herein. As shown in FIG. 6, the lift carriage 520 can include multiple sets of rollers, such as rollers 605 and 610. The rollers 605 and 610 can be coupled to the lift carriage 520 and can allow the lift carriage 520 to move vertically along the mast 515. In this way, the lift carriage 520 can provide vertical positioning of the telescopic structure 140 relative to an object or objective task.

Figure 7:
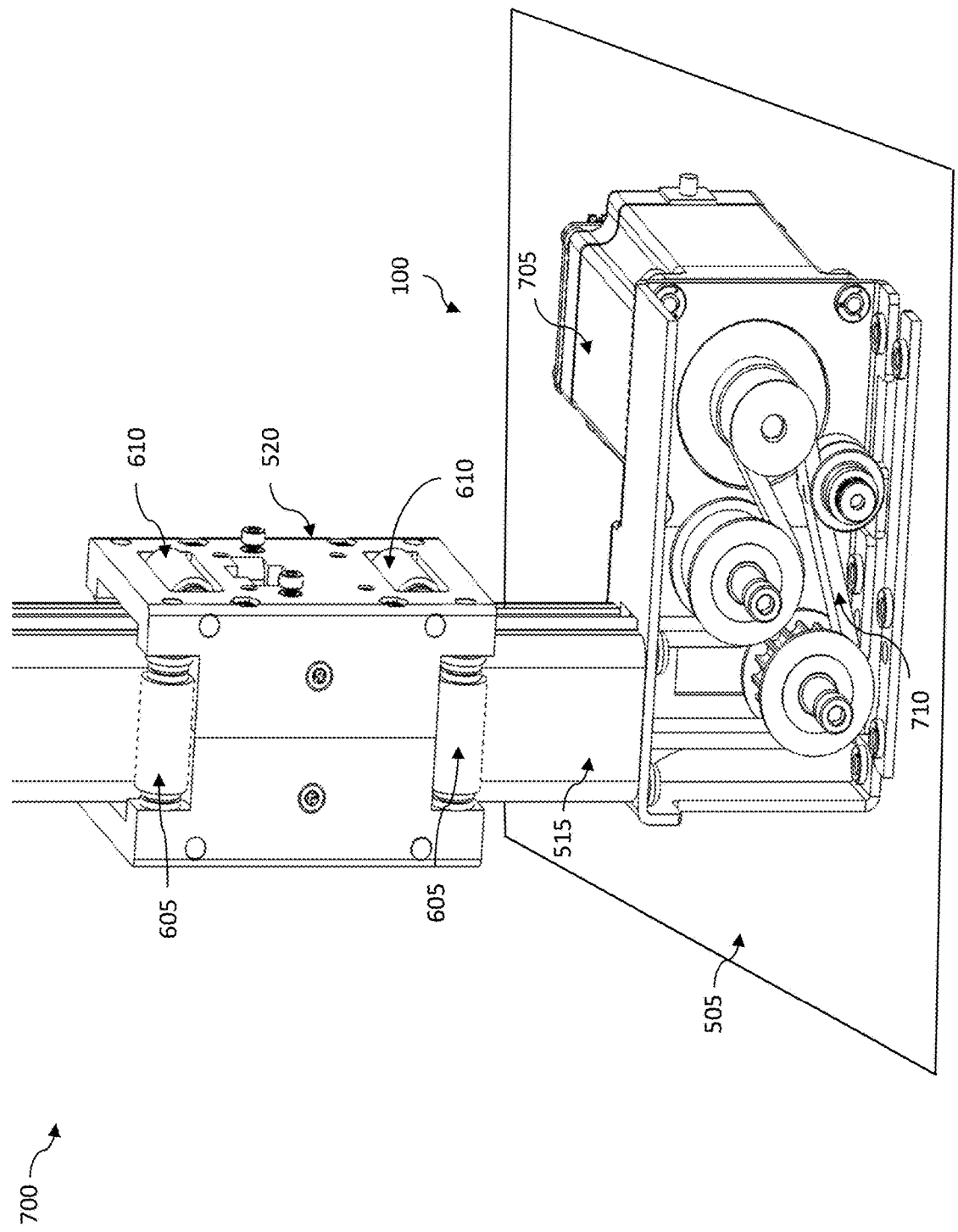
FIG. 7 is a diagram illustrating an exemplary embodiment of the lift carriage coupled to a second actuator of the actuation system as described herein.

FIG. 7 is a diagram illustrating an exemplary embodiment 700 of the lift carriage 520 coupled to a second actuator of the actuation system 100 as described herein. As shown in FIG. 7, the actuation system 100 can also include a second actuator 705 provided in the base 505 of the mobile robot 510. The second actuator 705 can be coupled to the lift carriage via a flexible drive element 710, such as timing belt. The flexible drive element 710 can be a loop drive structure that is coupled to the lift carriage 520. The second actuator 705 can impart a vertical translation force to the left carriage 520 to cause the lift carriage 520 to travel vertically along the mast 515. In some embodiments, the flexible drive element 710 can include a roller chain or a time belt and can convey the vertical translation force from the second actuator 705 to the lift carriage 520.

Figure 8:
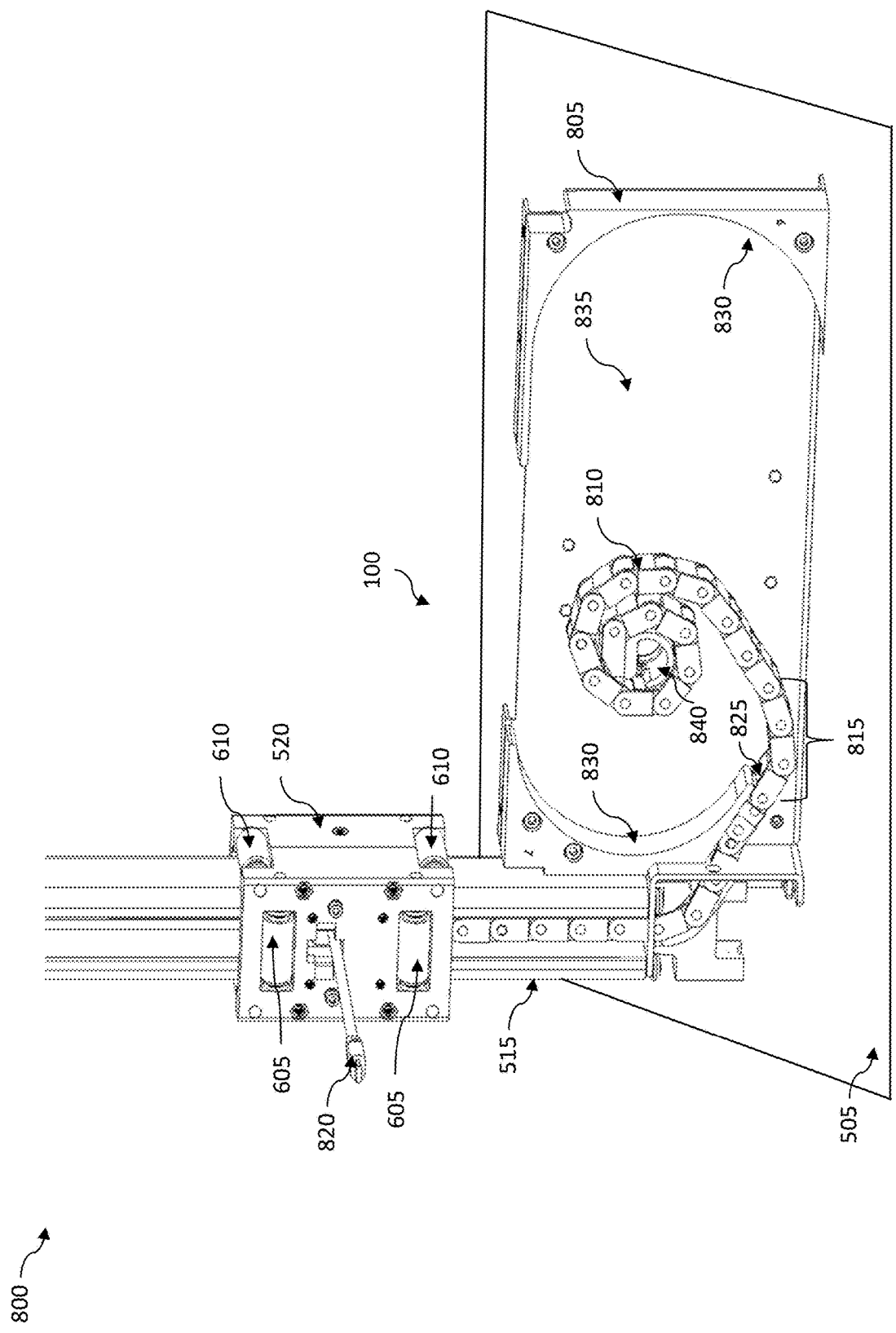
FIG. 8 is a diagram illustrating an exemplary embodiment of a second chain cartridge including a drag chain formed from a second plurality of inter-connected links coupled to the lift carriage as described herein.

FIG. 8 is a diagram illustrating an exemplary embodiment 800 of a second chain cartridge including a drag chain formed from a second plurality of inter-connected links coupled to the lift carriage 520 as described herein. As shown in FIG. 8, the actuation system 100 can also include a second chain cartridge 805 in the base 505. The second chain cartridge 805 can include a drag chain 810 including second plurality of inter-connected links 815 conveying a second one or more cables/lines 820 within a second interior space 825 of each of the second plurality of inter-connected links 815. The second one or more cables/lines 820 can include one or more of a data cable, a power cable, and/or a pneumatic line. As the lift carriage 520 is translated vertically along the mast 515, the drag chain 810 can wind or spool into the second chain cartridge 805 and/or unwind or unspool from within the second chain cartridge 805.

The second chain cartridge 805 can also include a curved guide tracks 830 formed within the internal surface 835 of the second chain cartridge 805. The curved guide tracks 830 can guide the drag chain 810 when spooling into or unspooling from within the second chain cartridge 805. The second chain cartridge 805 can also include a passively-rotating pinion 840 coupled to the internal surface 835 of the second chain cartridge 805.

In operation, In operation, the drag chain 810 is withdrawn from within the second chain cartridge 805 as the second actuator 705 actuates in a first direction imparting a linear translation force on the lift carriage via the timing belt 710 causing the lift carriage 520 to ascend upon the mast 515. The drag chain 110 is passively withdrawn from within the second chain cartridge 805 as the lift carriage 520 travels up the mast 515. Conversely, the drag chain 810 is pushed into the second chain cartridge 805 as the lift carriage 520 descends upon the mast 515. The curved guide tracks 830 can act with rotation of the pinion 840 in response to the second actuator 705 imparting a linear translation force on the lift carriage 520 via the timing belt 710 to cause the lift carriage 520 to descend upon the mast so that the drag chain 810 spools within the chain cartridge 805.

Figure 9:
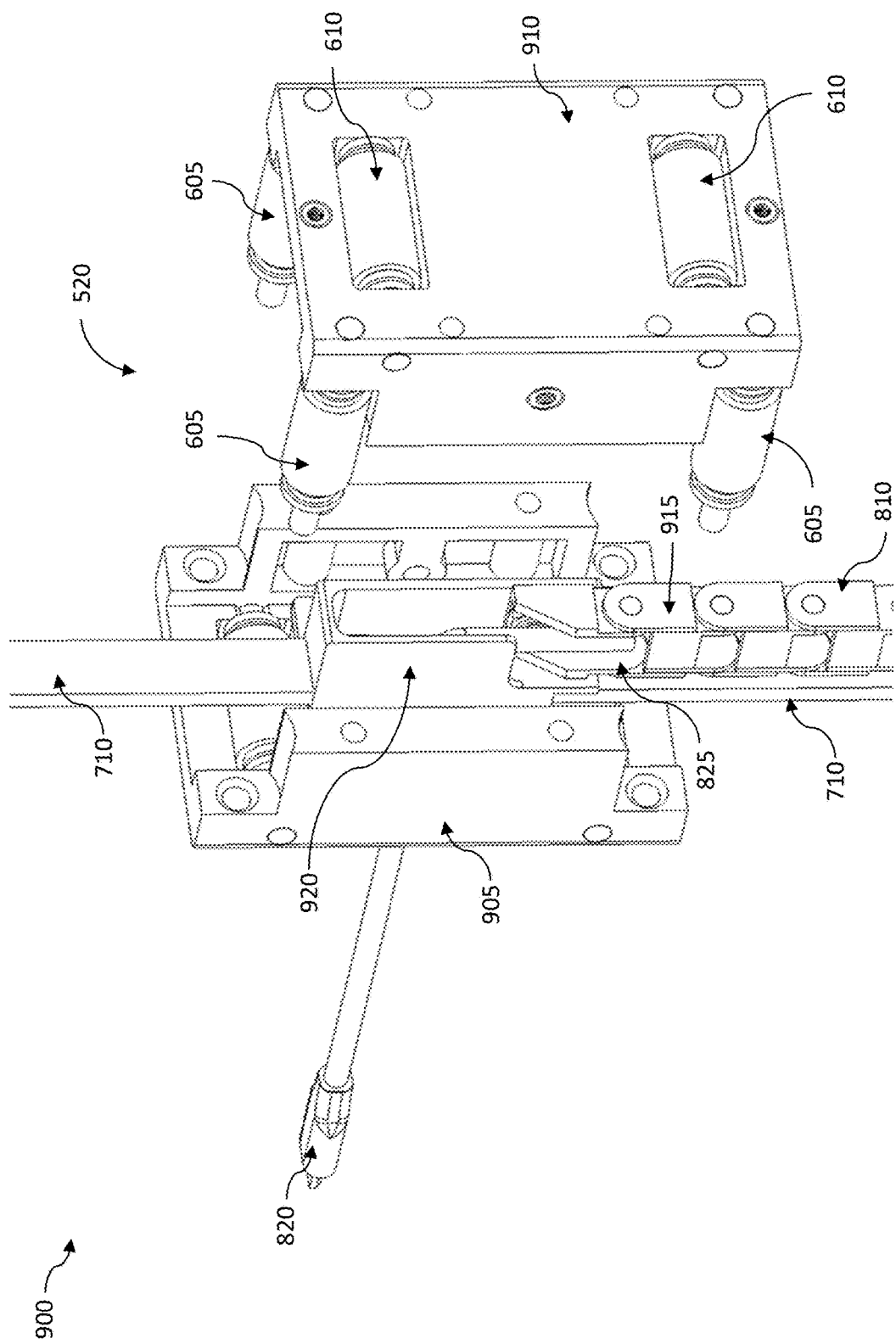
FIG. 9 is a diagram illustrating another exemplary embodiment of the lift carriage of FIGS. 5-8 as described herein.

FIG. 9 is a diagram illustrating another exemplary embodiment 900 of the lift carriage 520 of FIGS. 5-8 as described herein. As shown in FIG. 9, the lift carriage 520 can include a first portion 905 and a second portion 910. The first portion 905 and the second portion 910 can be detachably coupled to one another so as to surround the mast 515. Each of the first portion 905 and the second portion 910 can include a plurality of rollers 605, 610 configured to aid the lift carriage 520 as it translates along the mast 515. In some embodiments, the first portion 905 and the second portion 910 of the lift carriage 520 can include 1, 2, or 3 pairs of rollers 605, 610.

As further shown in FIG. 9, the lift carriage 520 can be coupled to the drag chain 810. The second one or more cables/lines 820 can exit the second interior space 825 of a distal link 915 of the drag chain 810 to pass through the lift carriage 520. As shown in FIG. 9, the second one or more cables/lines 820 pass through the first portion 905 of the lift carriage 520, however, in some embodiments, the second one or more cables/lines 820 can pass through the second portion 910 of the lift carriage 520. The distal link 915 of the drag chain 810 can couple to an internal guide 920 of the lift carriage 520. The internal guide 920 can be integrally formed within either of the first portion 905 or the second portion 910 of the lift carriage 520.

Still referring to FIG. 9, the timing belt 710 can be secured to the lift carriage 520. For example, the timing belt 710 can be secured to the lift carriage via a clamp. The clamp can hold the timing belt 710 in place via engagement features configured to engage engagement features (e.g., teeth) of the timing belt 710. The clamp can be loosened from the lift carriage 520 via bolts to make it easier to install the timing belt 710 or to adjust a position of the lift carriage 520 on the timing belt 710.

Figure 10:
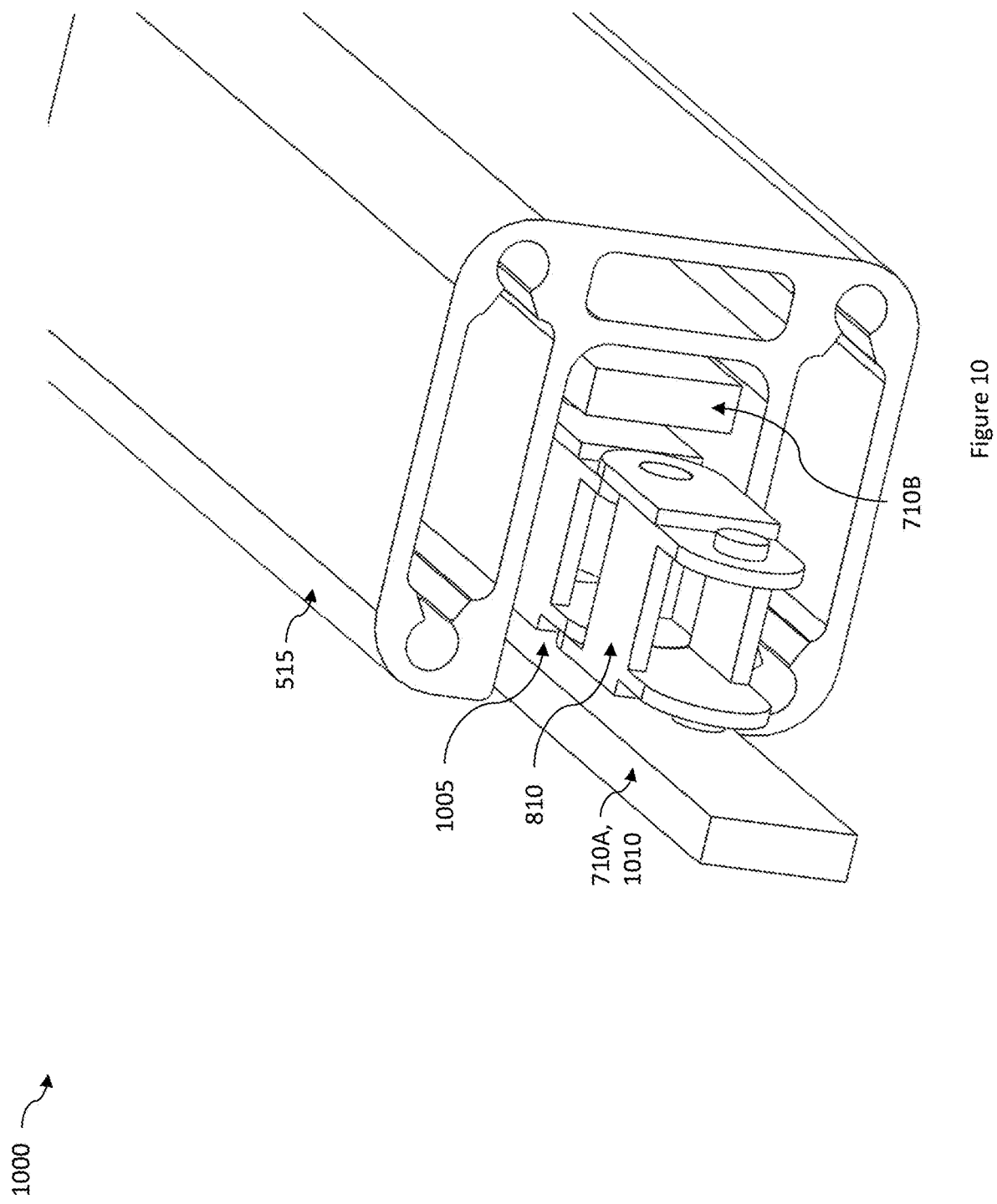
FIG. 10 is a diagram illustrating an exemplary embodiment of a mast of the actuation system as described herein.

FIG. 10 is a diagram illustrating an exemplary embodiment 1000 of a mast 515 of the actuation system 100 as described herein. As shown in FIG. 10, the mast 515 can include a channel 1005 configured within the mast 515. The channel 1005 can be formed as a C-shaped channel or a U-shaped channel as shown in FIG. 10. A variety of non-limiting channel shapes can envisioned without limitation. The channel 1005 can guide the drag chain 810 linearly within the mast 515. The mast 515 can also include a keeper 1010 to retain the drag chain 810 in a rigid linear configuration within the channel 1005 during retraction into or extension from the second chain cartridge 805. In some embodiments, the keeper 1010 can include a brush wiper, a rubber gland, a compliant flap or seal, or a spool of metal tape. In some embodiments, the keeper 1010 can include the flexible drive element 710. For example, the flexible drive element 710 can be formed as a loop coupling the second actuator and a pulley coupled atop of the mast 515. Thus, two portions of the flexible drive element 710 can be configured to translate within the mast 515, e.g., portions 710A and 710B. In some embodiments, a first portion 710A of the flexible drive element 710 can act as the keeper 1010 to retain the drag chain 810 within the channel 1005.

Figure 11:
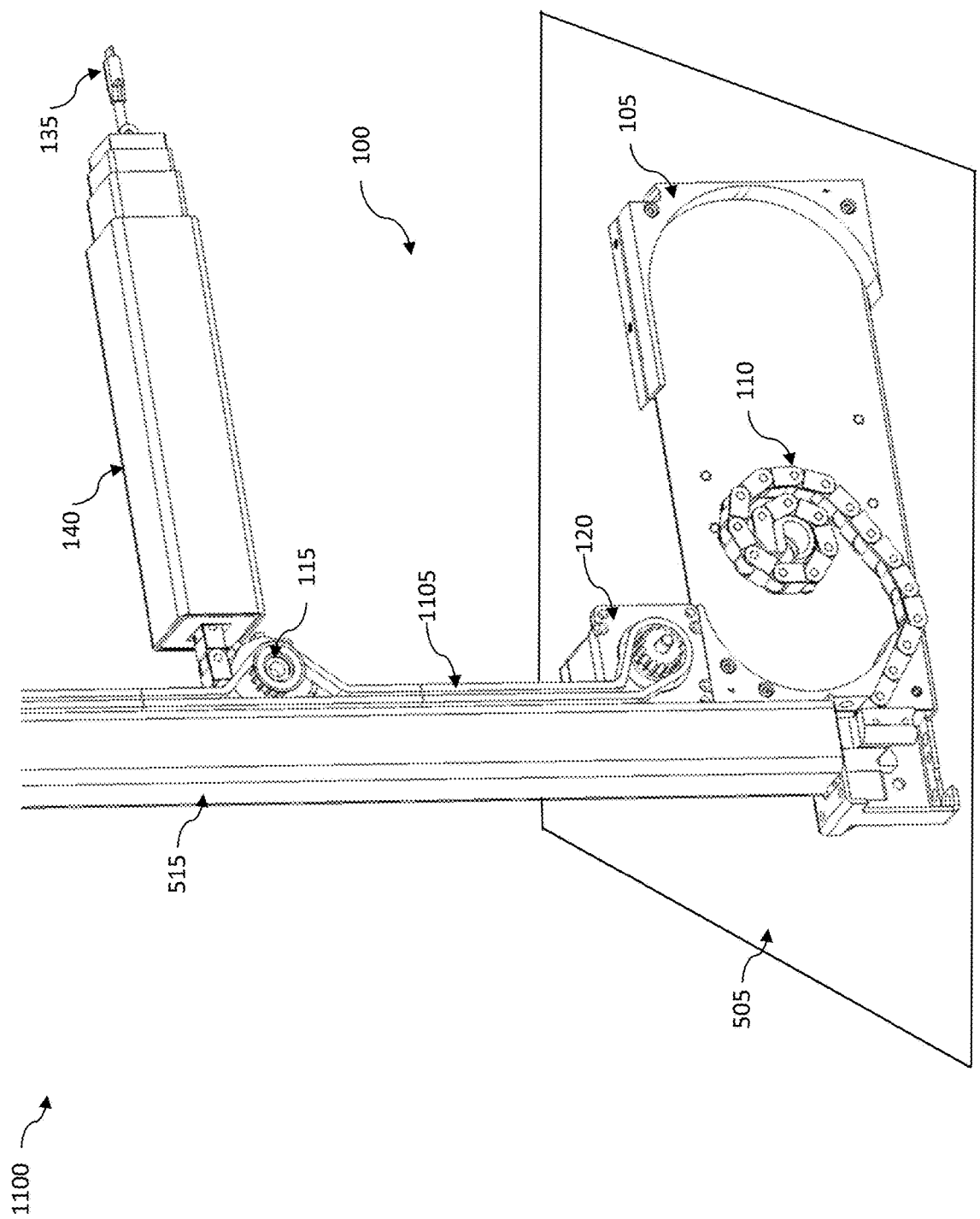
FIG. 11 is a diagram illustrating an exemplary embodiment of a drive transmission of the actuation system described herein.

FIG. 11 is a diagram illustrating an exemplary embodiment 100 of a drive transmission of the actuation system 100 described herein. As shown in FIG. 11, the actuator 120 and the chain cartridge 105 can be located in the base 505 of the mobile robot 510 and remotely from the drive mechanism 115. The actuator 120 can be coupled to the drive mechanism 115 via a drive transmission 1105. In some embodiments, the actuator 120 can be coupled to the drive mechanism 115 via a timing belt, a differential belt, a coupled belt, a gearbox, or a chain drive. By locating the actuator 120 and the chain cartridge 105 remotely from the drive mechanism 115, the overall footprint, size, and weight of the base 505 of the mobile robot 510 can be reduced.

Figure 12:
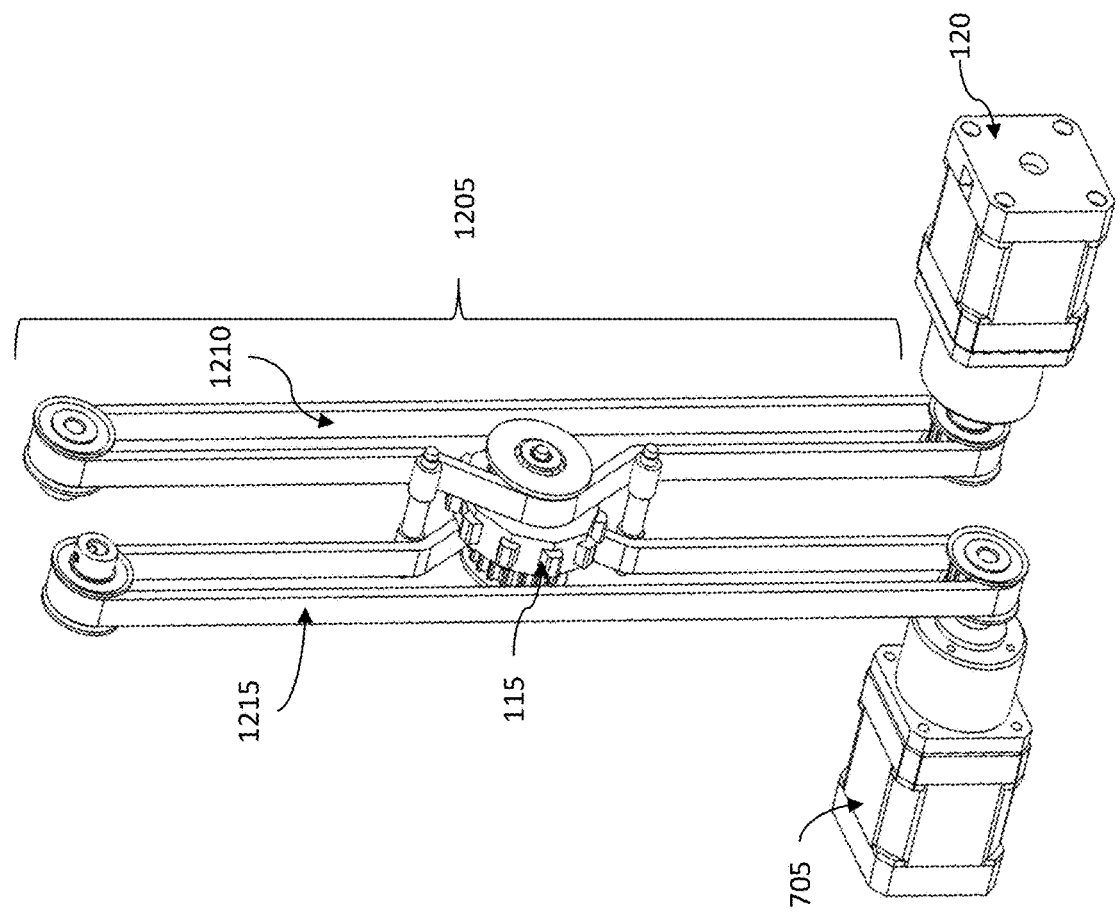
FIG. 12 is a diagram illustrating an exemplary embodiment of a differential transmission of the actuation system as described herein.

FIG. 12 is a diagram illustrating an exemplary embodiment 1200 of a differential transmission of the actuation system 100 as described herein. As shown in FIG. 12, in some embodiments, the drive transmission 1105 can be configured as a differential transmission 1205. The differential transmission 1205 can include a first differential drive belt 1210 coupling the first actuator and the drive mechanism 115. The differential transmission 1205 can also include a second differential drive belt 1215 coupling the second actuator 705 and the drive mechanism 115. As the first actuator 120 and the second actuator 705 actuate the first differential drive belt 1201 and the second differential drive belt 1215 together in the same direction relative to each other, the lift carriage 520 can travel vertically on the mast 515. Thus, a net linear force is conveyed to the lift carriage 520 due to motion of the first differential drive belt 1210 and the second differential drive belt 1215 in the same direction relative to each other (e.g., each of the first differential drive belt 1210 and the second differential drive belt 1215 traveling upward together or downward together). When the first actuator 120 and the second actuator 705 actuate the first differential drive belt 1210 and the second differential drive belt 1215 together in an opposite direction relative to each other, the telescopic structure 140 can extend or retract. As a result, a net torque can be applied to the drive mechanism 115 causing the telescopic structure to extend or retract horizontally relative to the base 505 (or a surface on which the base 505 is located).

Figure 13:
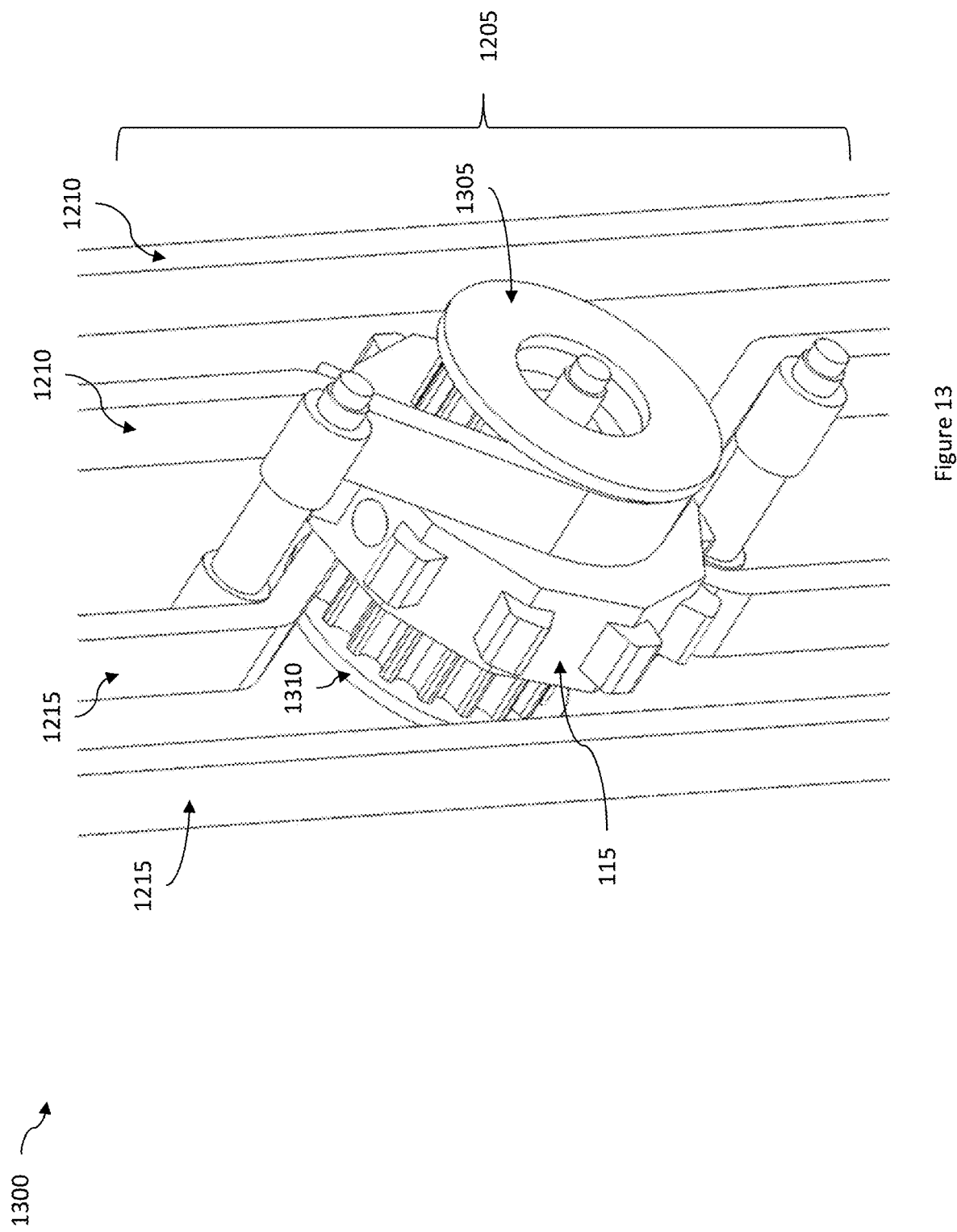
FIG. 13 is a diagram illustrating the drive mechanism of the differential transmission of FIG. 12 as described herein.

FIG. 13 is a diagram illustrating the drive mechanism 115 of the differential transmission of FIG. 12 as described herein. As shown in FIG. 13, the drive mechanism 115 can be configured to couple to the first differential drive belt 1210 and to the second differential drive belt 1215. The drive mechanism 115 can include a first pulley 1305 coupling the first differential drive belt 1210 to the drive mechanism 115 and a second pulley 1310 coupling the second differential drive belt 1310 to the drive mechanism.

Figure 14:
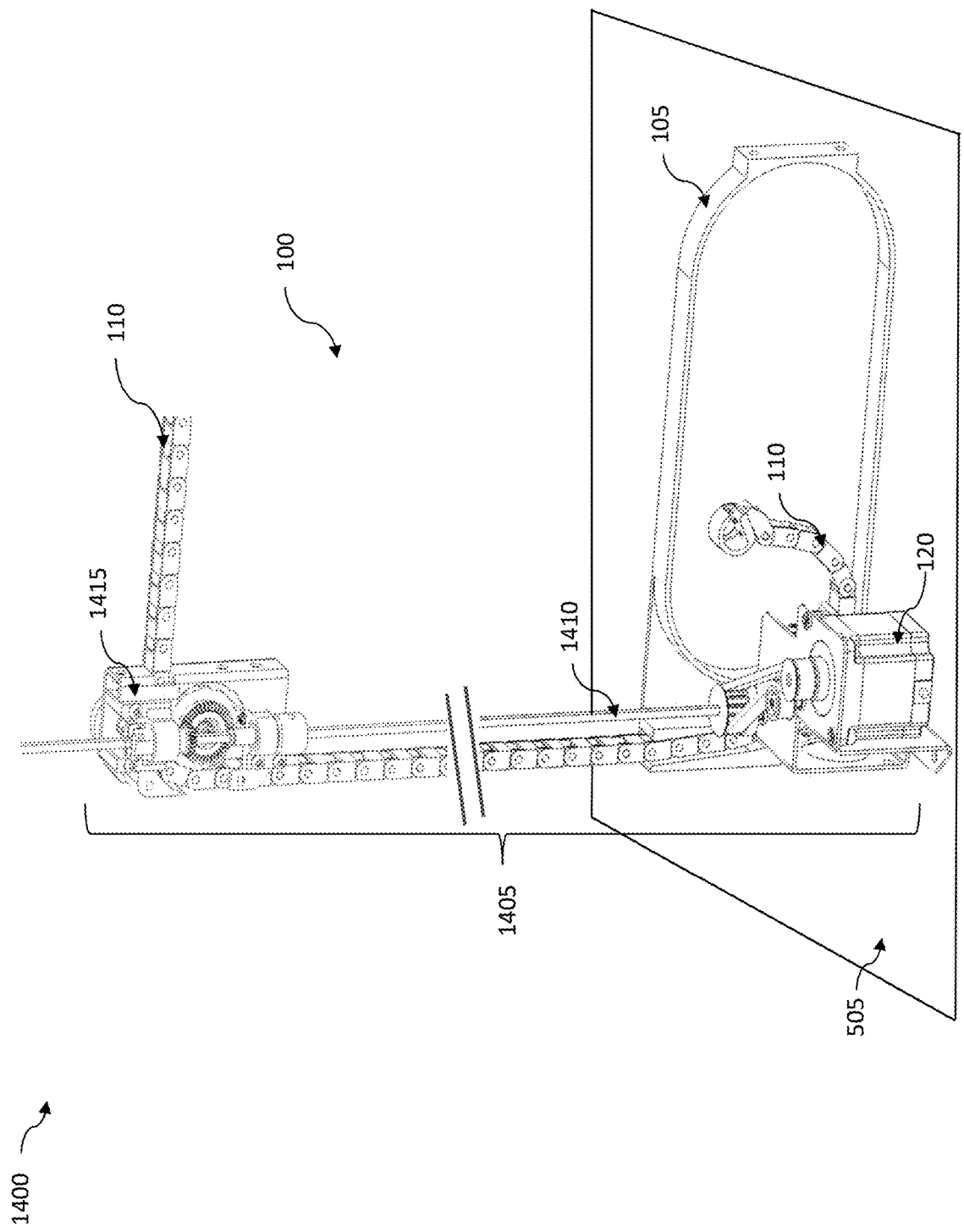
FIG. 14 is a diagram illustrating an exemplary embodiment of a rotary shaft transmission of the actuation system as described herein.

FIG. 14 is a diagram illustrating an exemplary embodiment 1400 of a rotary shaft transmission of the actuation system 100 as described herein. In some embodiments, the drive transmission 1105 can be configured as a rotary shaft transmission 1405. As shown in FIG. 14, the rotary shaft transmission 1405 can include a rotary drive shaft 1410 coupling the actuator 120 to a right-angled gear box 1415. The right-angled gear box 1415 can travel vertically along the rotary drive shaft 1410 as the lift carriage translates vertically along the mast 515. The rotary drive shaft 1410 can have a square-shaped cross-section and can be configured to pass within the lift carriage 515. In this embodiment, vertical translation of the lift carriage 515 and horizontal translation of the telescopic structure 140 are not coupled to the same drive transmission.

Figure 15:
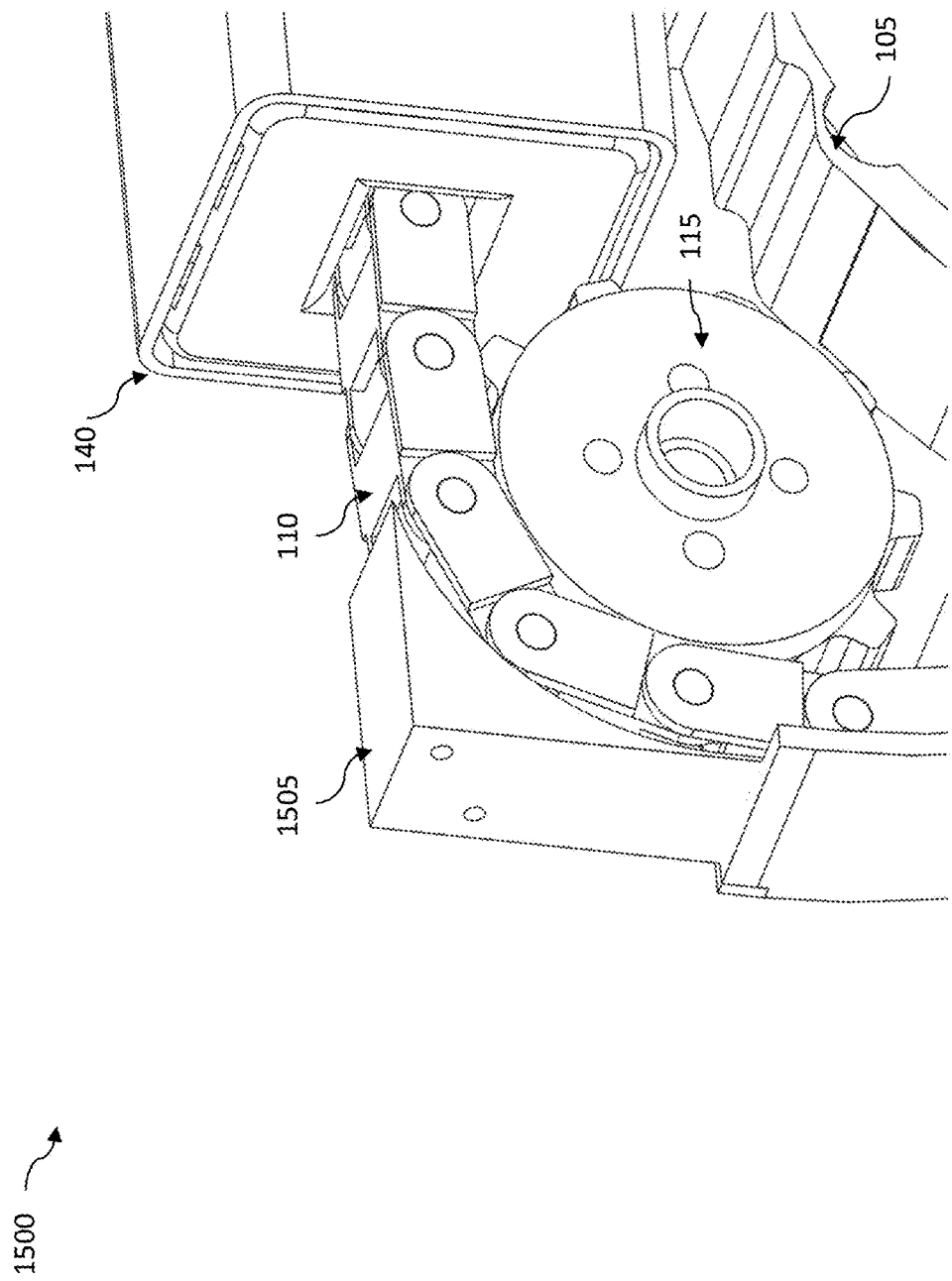
FIG. 15 is a diagram illustrating an exemplary embodiment of a drive chain guide of the actuation system as described herein.

FIG. 15 is a diagram illustrating an exemplary embodiment 1500 of a drive chain guide of the actuation system 100 as described herein. As shown in FIG. 15, the drive mechanism 115 can be configured with a drive chain guide 1505 to retain the drive chain 110 radially with respect to the drive mechanism 115. In some embodiments, the drive chain guide 1505 can include at least one roller located above or below the drive chain 110 at an opening of the chain cartridge 105 where the drive chain 110 extend from or retracts into the chain cartridge 105.

Figure 16:
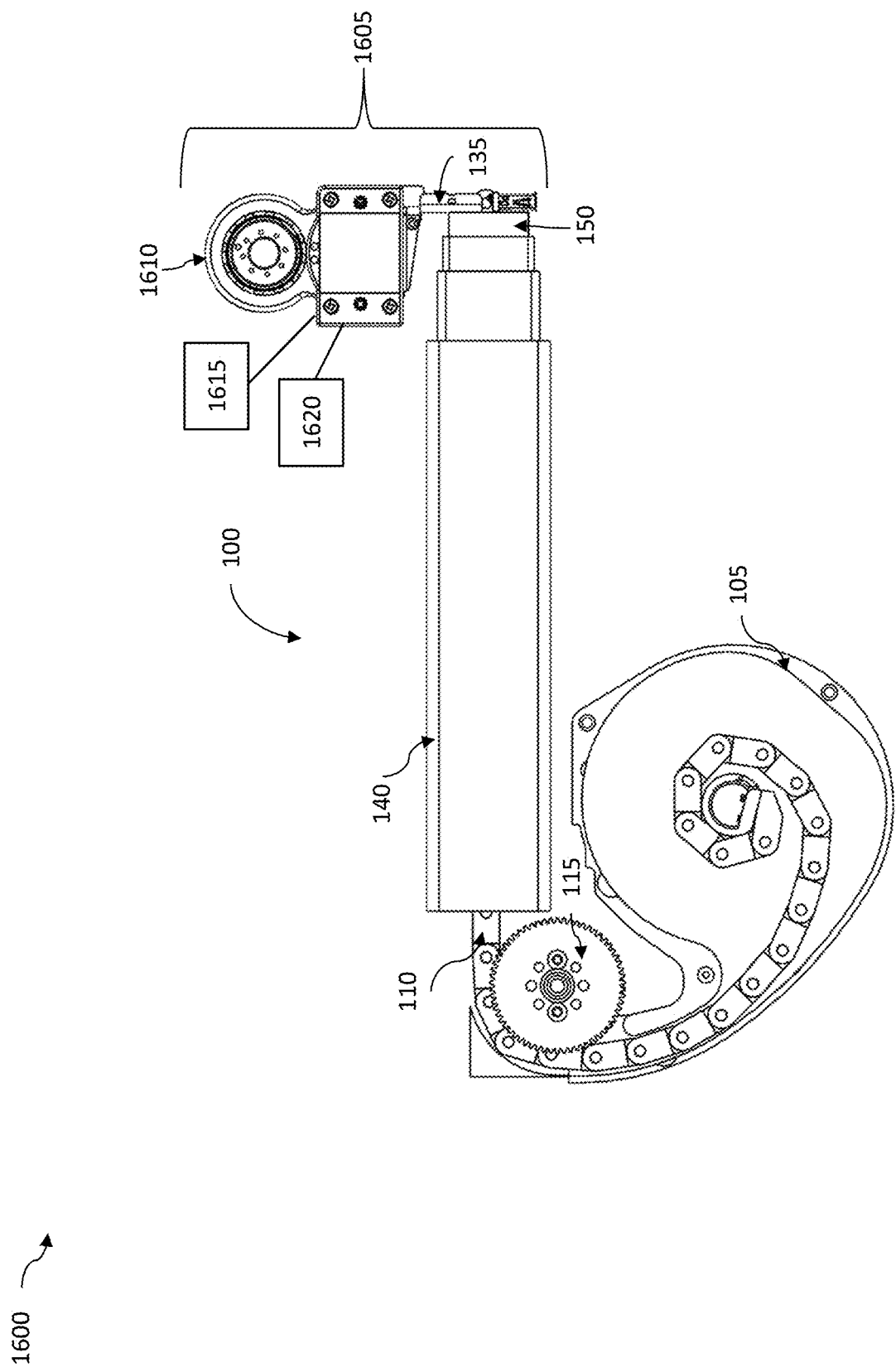
FIG. 16 is a diagram illustrating an exemplary embodiment of a manipulator payload of the actuation system as described herein.

FIG. 16 is a diagram illustrating an exemplary embodiment 1600 of a manipulator payload of the actuation system 100 as described herein. As shown in FIG. 16, the actuation system 100 can include a manipulator payload 1605 coupled to the distal segment 150 of the telescopic structure 140. The manipulator payload 1605 can be configured with respect to an objective task to be performed using the actuation system 100. In some embodiments, the manipulator payload 1605 can include a third actuator 1610, a sensor 1615, or a tool 1610. The one or more cables/lines 135 conveyed within the drive chain 110 can exit the distal segment 150 of the telescopic structure 140 to couple with the manipulator payload 1605.

Figure 17:
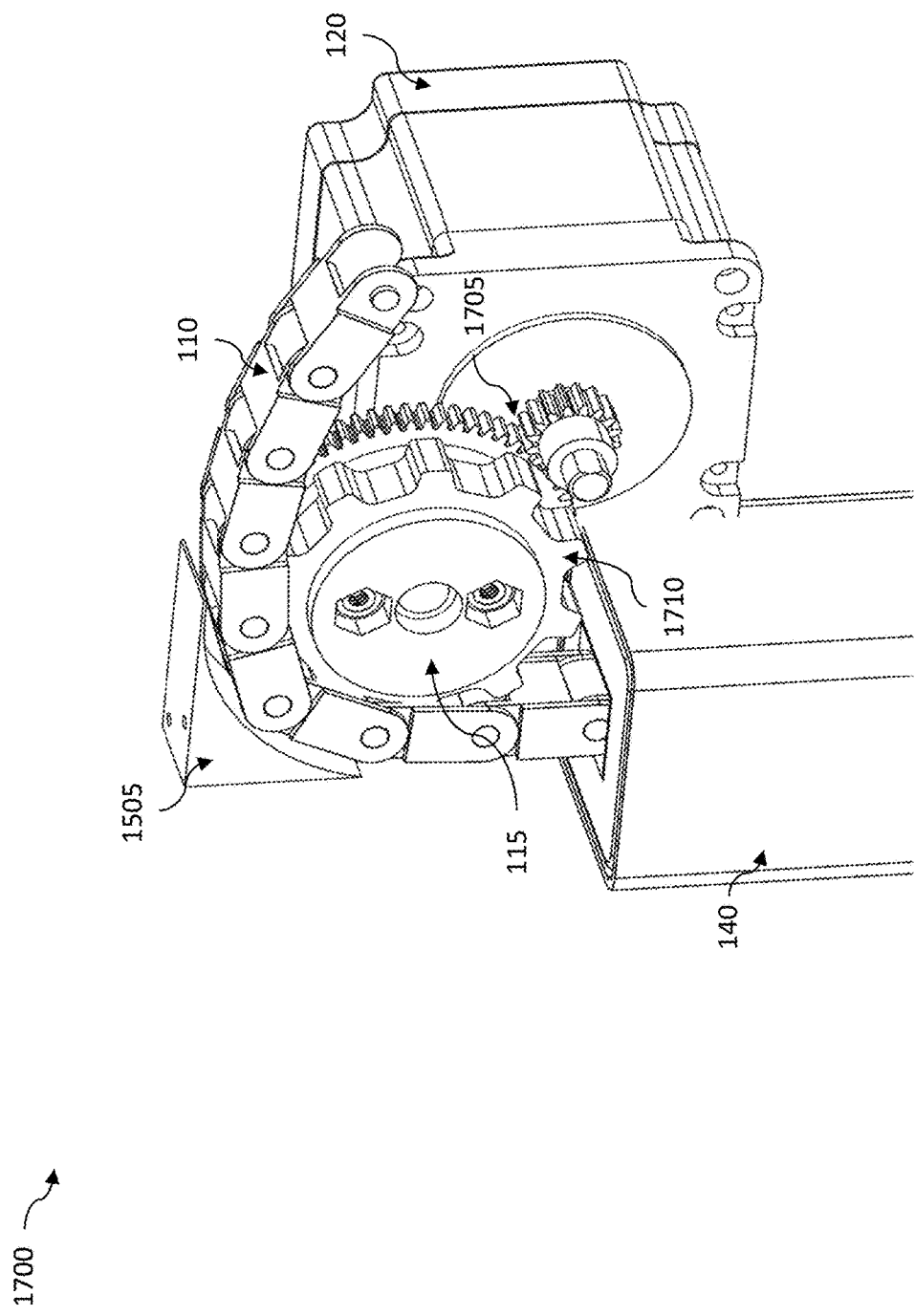
FIG. 17 is a diagram illustrating an exemplary embodiment of an actuator coupled to a drive mechanism of the actuation system as described herein.

FIG. 17 is a diagram illustrating an exemplary embodiment 1700 of an actuator 120 coupled to a drive mechanism 115 of the actuation system 100 as described herein. The actuator 120 can coupled to the drive mechanism 115 via a spur gear 1705. In some embodiments, the actuator 120 can be coupled to the drive mechanism 115 via a timing belt, a differential belt, a coupled belt, a gearbox, or a chain drive. The drive mechanism 115 can include a plurality of engagement features 1710 to engageably couple the drive chain 110 to the drive mechanism 115. In some embodiments, the engagement features 1710 can include tooth engagement features, cog engagement features, or friction rollers.

Figure 18:
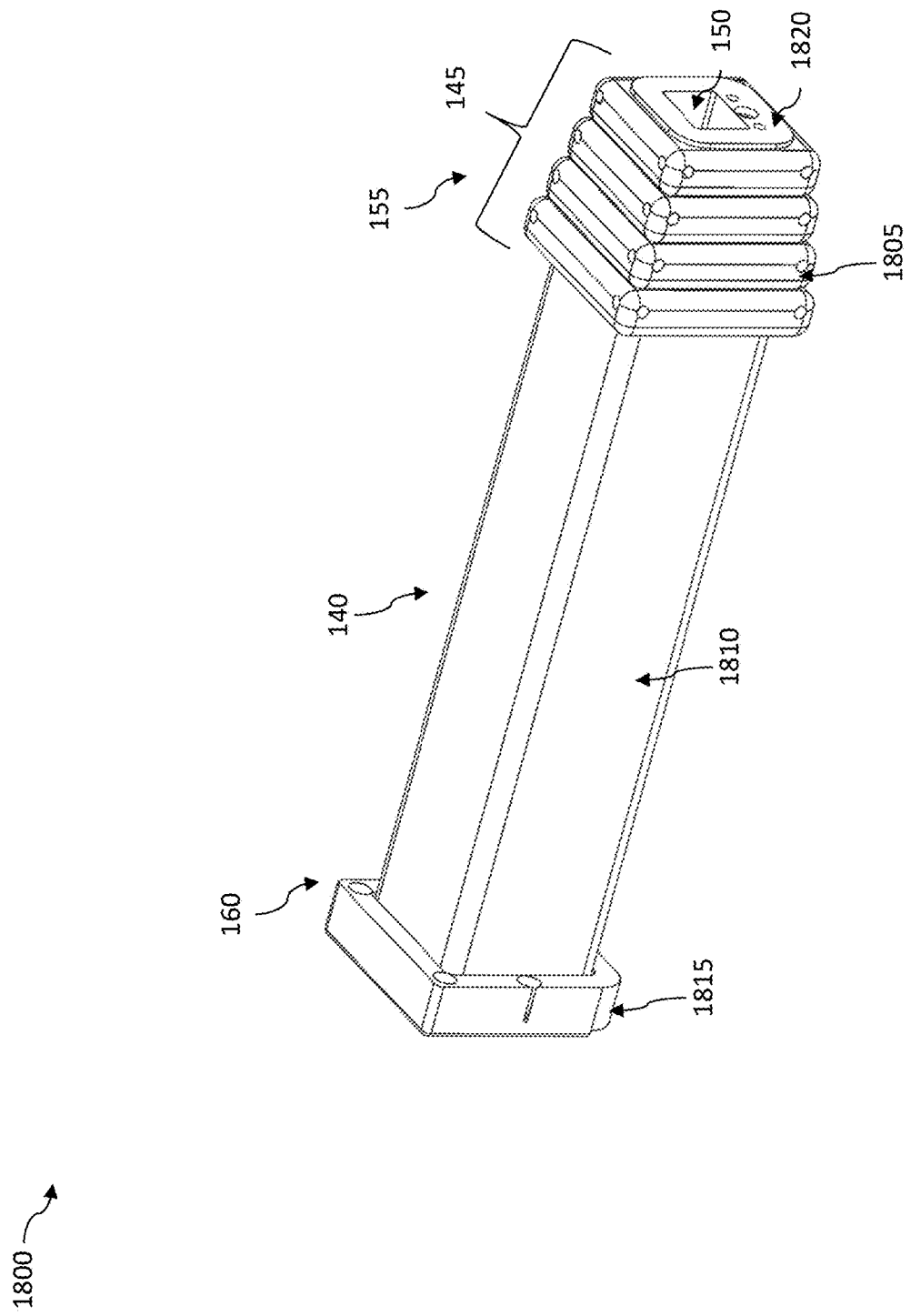
FIG. 18 is a diagram illustrating an exemplary embodiment of a plurality of segments of a telescopic structure of the actuation system as described herein.

FIG. 18 is a diagram illustrating an exemplary embodiment 1800 of a plurality of segments 145 of a telescopic structure 140 of the actuation system 100 as described herein. The telescopic structure 140 is shown in FIG. 18 in a fully retracted configuration such that four segments are nested together. As shown in FIG. 18, the plurality of segments 145 can include a square-shaped cross-section. In some embodiments, the plurality of segments 145 can include a rectangular-shaped cross-section, a circular-shaped cross-section, a curved-shaped cross-section, or a triangular-shaped cross-section. The plurality of segments 145 can be formed from injection molded plastic, carbon fiber, extruded aluminum, or ultrasonically welded plastic.

As further shown in FIG. 18, each segment of the plurality of segments 145 can include an outer cuff 1805 attached to a distal end 155 of the segment. The proximal segment 1810 of the telescopic structure 140 can include an arm attachment feature 1815. The arm attachment feature 1815 can be bonded or similarly affixed to the proximal segment 1810. The arm attachment feature 1815 can be received within the lift carriage 520. The distal segment 150 can include an manipulator payload attachment feature 1820 that can be bonded or similarly affixed to the distal segment 150 and configured to couple the distal segment 150 to the manipulator payload 1605 shown in FIG. 16.

Figure 19:
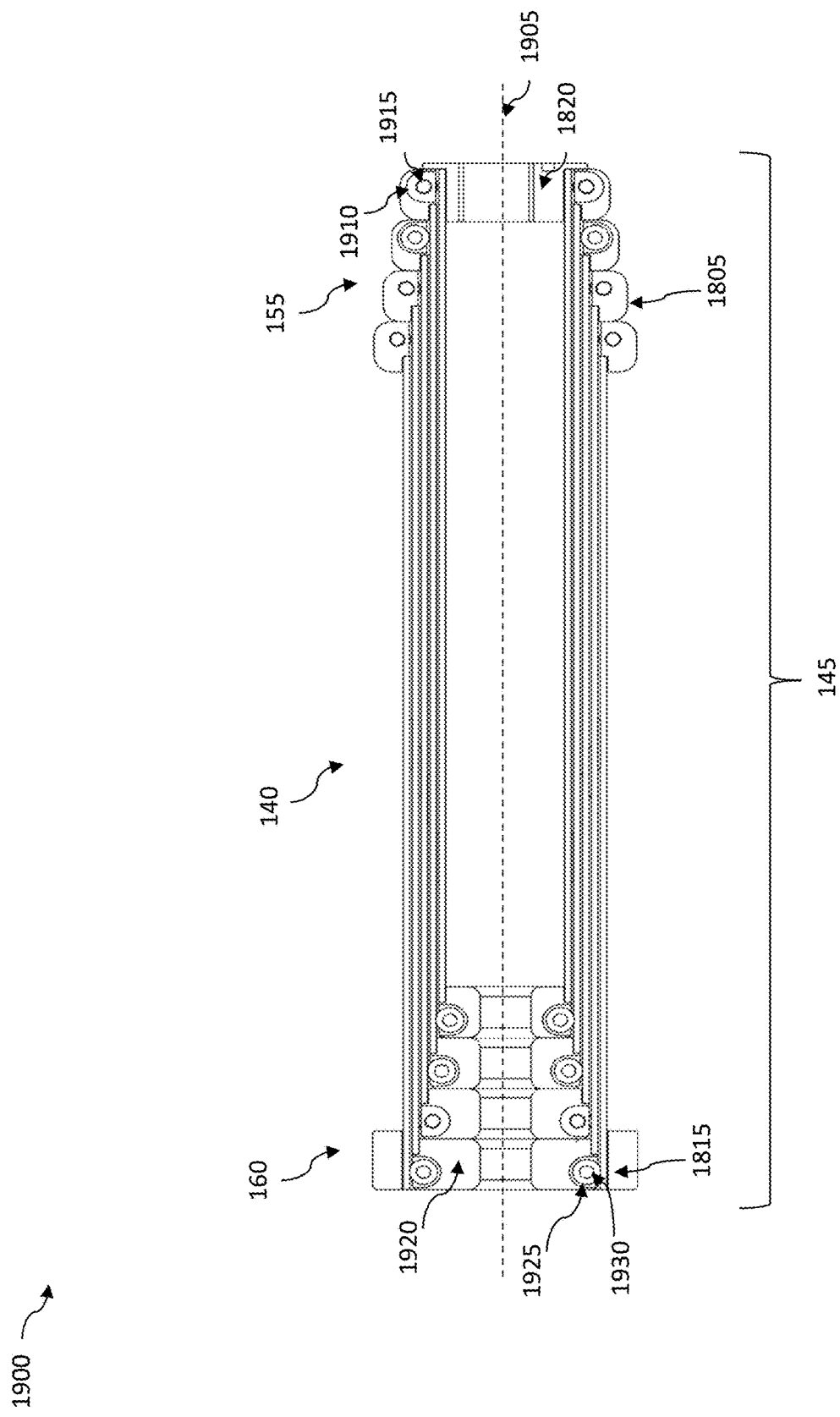
FIG. 19 is a diagram illustrating an exemplary embodiment a plurality of rollers of the telescopic structure of the actuation system as described herein.

FIG. 19 is a diagram illustrating an exemplary embodiment 1900 a plurality of rollers of the telescopic structure 140 of the actuation system 100 as described herein. As shown in FIG. 19, the telescopic structure can be formed as a plurality of segments 145 in a nested arrangement of individual segments, which can extend or retract from one another along a telescopic axis 1905. The telescopic structure 140 can translate telescopically in a smooth manner with low friction while supporting a payload, and while providing sufficient rigidity so as not to droop or sag when extended.

As shown in FIG. 19, an outer cuff 1805 can be affixed to a distal end 155 of a segment. The outer cuff 1805 can include one or more cylindrical outer cuff rollers 1910. The outer cuff rollers 1910 can be coupled to the outer cuff 1805 via a pin 1915 passing through the cylindrical outer cuff roller 1910 and secured within the outer cuff 1805. The outer cuff rollers 1910 of a first segment can maintain sufficient contact force with an exterior surface of a second segment extending from within the first segment to maintain the telescopic structure 140 in a rigid configuration during extension or retraction. As further shown in FIG. 19, an inner cuff 1920 can be positioned in a proximal end 160 of each segment. The inner cuff 1920 can include one or more cylindrical inner cuff rollers 1925. The cylindrical inner cuff rollers 1925 can be coupled to the inner cuff 1920 via a pin 1930 passing through the cylindrical inner cuff roller 1925 and secured within the inner cuff 1920. The inner cuff rollers 1925 of a first segment can maintain sufficient contact force with an interior surface of a second segment from which the first segment extends to further maintain the telescopic structure 140 in a rigid configuration during extension or retraction.

The outer cuffs 1805 and the inner cuffs 1920 can be formed from a thermally active material. In this way, any undue preloading in the roller caused by inaccurate clearance tolerances can be reduced by heating the up the telescopic structure 140 to an activation point of thermally active material. As the preloading relaxes, the rollers 1915 and 1925 can set themselves in a low friction position. This can advantageously increase the performance of the contact sensitivity of the telescopic structure 140.

The outer cuff rollers 1915 and the inner cuff roller 1925 can be formed from a non-marring material such as engineered plastic and/or carbon fiber. In some embodiments, sliding bushing surfaces can be configured in place of the outer cuff rollers 1915 and the inner cuff rollers 1925.

Figure 20:
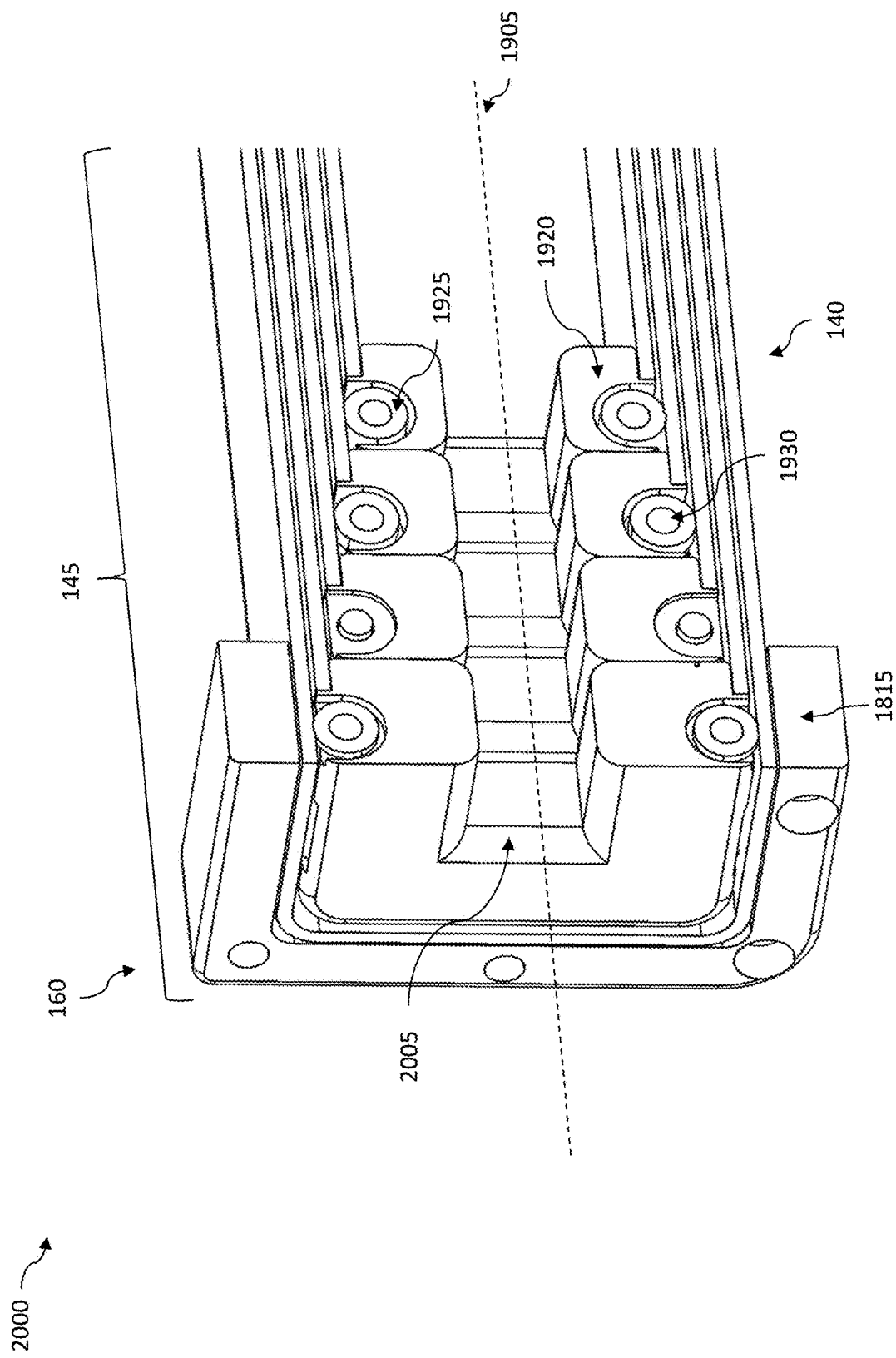
FIG. 20 is a diagram illustrating an exemplary embodiment of a drive chain guide of the telescopic structure of the actuation system as described herein.

FIG. 20 is a diagram illustrating an exemplary embodiment 2000 of a drive chain guide 2005 of the telescopic structure 140 of the actuation system 100 as described herein. The drive chain guide 2005 can be located in the proximal end 160 of each segment of the plurality of segments 145. The drive chain guide 2005 can guide the drive chain 110 along the telescopic axis 1905 as the drive chain 110 is translated within the telescopic structure 140. The drive chain guide 2005 can constrain the links of the drive chain 110 in a linear arrangement and can allow for more efficient transmission of forces from the drive mechanism 115 to the distal segment 150. The drive chain guide 2005 can also reduce buckling of the drive chain 110 during retraction of the drive chain 110 as the telescopic structure 140 retracts from an extended position.

Figure 21:
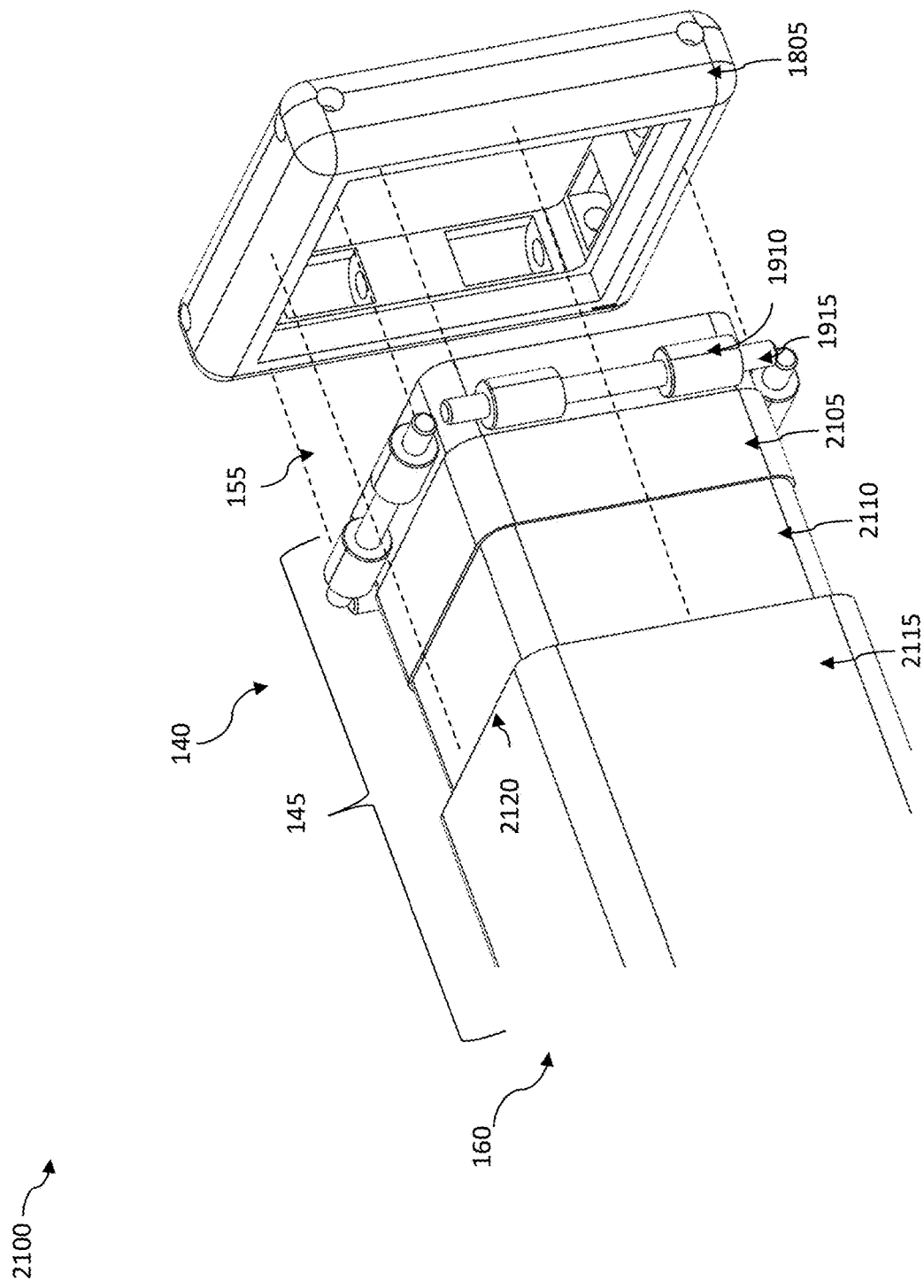
FIG. 21 is a diagram illustrating an exemplary embodiment of an extension limiter of the telescopic structure of the actuation system as described herein.

FIG. 21 is a diagram illustrating an exemplary embodiment 2100 of an extension limiter 2105 of the telescopic structure 140 of the actuation system 100 as described herein. FIG. 21 is an exploded view of the telescopic structure and relates to a fully assembled view shown in FIG. 19. As shown in FIG. 21, the outer cuff 1805 of the segment 2115 has been extended away, as shown by dashed lines, from its assembled position on the distal end 2120 of segment 2115. In this way, the outer cuff rollers 1910 can be seen to abut the extension limiter 2105. The outer cuff roller 1910 and pin 1915 are secured within the outer cuff 1805 as described in relation to FIG. 19. As shown in FIG. 21, the outer cuff roller 1910 and the pin 1910 are extended away from the outer cuff 1805, as shown by dashed lines.

In the view of the embodiment shown in FIG. 21, a first segment 2110 can extend from within a second segment 2115. The extension limiter 2105 can limit the extension of segment 2110 from within segment 2115 as the telescopic structure 140 extends away from the mast 515. In some embodiments, one or more of the segments of the plurality of segments 145 can include an extension limiter 2105. The extension limiter 2105 can prevent over-extension or hyperextension of a first segment with respect to a second segment. The first segment 2110 can extend from within the second segment 2115 until the outer cuff roller 1910 of the second segment 2115 contacts the extension limiter 2105 of the first segment 2110. In this way, hyperextension of the telescopic structure 140 can be eliminated.

The extension limiter 2105 can include a thin band of material formed on an external surface of one or more segments 145. In some embodiments, the extension limiter 2105 can be formed from molded plastic, metal tape, sheet metal, or a portion of the segment itself, such as a protrusion. The extension limiter 2105 can be affixed or located at a location on a segment to ensure maximal extension of one segment from within another and thus maximal extension of the telescopic structure 140. Locating the extension limiter 2105 farther away from the distal end 155 of a segment or the telescopic structure 140 (e.g., close to the proximal end 160 of a segment or to the telescopic structure), arm extension can be performed with reduced drooping of the segments 145.

Figure 22:
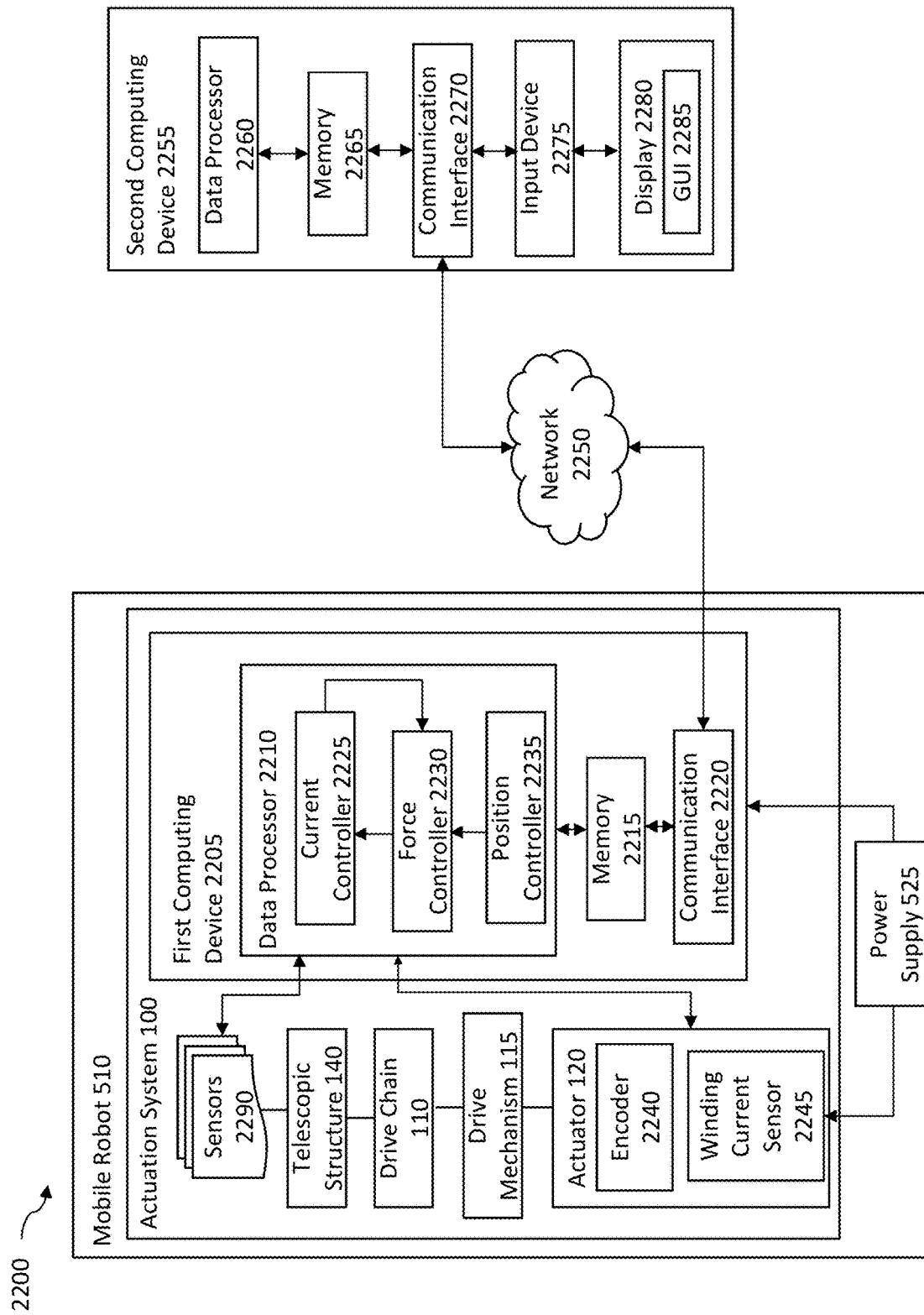
FIG. 22 is a diagram illustrating an exemplary embodiment of a computing architecture configured to actuate the telescopic structure of the actuation system as described herein.

FIG. 22 is a diagram illustrating an exemplary embodiment of a computing architecture 2200 configured to actuate the telescopic structure 140 of the actuation system 100 as described herein. As shown in FIG. 22, the actuation system 100 can be configured within a mobile robot 510. In some embodiments, the actuation system 100 may not be configured within a mobile robot and can be configured in an alternate structure suitable for containing or coupling to the actuation system 100.

The actuation system 100 can include a first computing device 2205 including a data processor 2210, a memory 2215 and a communication interface 2220. The memory 2215 can store non-transitory computer-readable, executable instructions, which when executed by the data processor 2210, can cause the data processor to perform actuation of the actuation system 100 and/or the mobile robot 510. The data processor 2210 can be configured with one or more controllers. The controllers can be configured to control one or more operational aspects of the actuation system 100. For example, the data processor 2210 can be configured to include a current controller 2225, a force controller 2230, and a position controller 2235.

The current controller 2225 can be configured to generate actuation signals in response to input signals received from the force controller 2230. The actuation signals can be provided to the actuator 120. The force controller 2230 can receive inputs associated with a measured interaction force (Fi), a maximum interaction force (Fm), and a desired/objective output force (Fo). The position controller 2235 can be configured output the desired or objective output force (Fo) based on inputs of measured and desired/objective position/location data associated with a position/location of the telescopic structure 140.

The actuation signals can be generated in response to sensor data received by the data processor 2210 from sensors 2290. In some embodiments, the sensors 2290 can include a force sensor coupled to the telescopic structure 140. The sensor data can include the measured position/location data and the measured interaction force (Fi). In some embodiments, the sensor data can be received from the sensor 1616. In some embodiments, the sensor data can be received from additional sensors, such as additional sensors coupled to the telescopic structure 140, the mobile robot base 505, the mobile robot 510, and/or the actuator 120. For example, the sensor data can include data received from the encoder 2240 and the winding current sensor 2245 configured with respect to the actuator 120. The encoder 2240 can generate sensor data based on angular position or motion of a rotating shaft of the actuator 120, such as a shaft coupled to the drive mechanism 115. The winding current sensor 2245 can generate sensor data based on a winding current of the actuator 120.

The actuator 120 can be powered by a power supply 525 configured in the base 505 of the mobile robot 510. The data processor 2210 can be communicatively coupled to the actuator 120 to provide the actuation signals generated by the current controller 2225. The actuator 120 can actuate in response to the actuation signals to cause the drive mechanism 115 to rotate in a desired direction and at a desired speed. The telescopic structure 140 can be mechanically coupled to the actuator 120 via the drive mechanism 115 and the drive chain 110. Responsive to the actuator 120 actuating the drive mechanism 115, the actuation system 100 can actuate the lift carriage 520, the telescopic structure 140, and/or the manipulation payload 1605.

The first computing device 2205 can be coupled to a second computing device 2245 via a data/communication network 2250. The second computing device 2255 can include a data processor 2260, a memory 2265 storing non-transitory computer-readable, executable instructions, a communication interface 2270, an input device 2275, and a display 2280 configured to provide a graphical user interface (GUI) 2285.

The second computing device 2255 can be configured to receive user inputs via the input device 2270 and/or the GUI 2285. The user inputs can be processed and transmitted via the communication interface 2270 to the communication interface 2220 of the first computing device. Once received, the actuation system 100 can be configured to generate an actuation signal responsive to the user inputs causing the actuation system 100 and/or the mobile robot 510 to actuate. In some embodiments, the input device can include a joystick, a microphone, a stylus, a keyboard, a mouse, or a touchscreen. In some embodiments, the display 2280 can include a touchscreen display and the GUI 2285 can display sensor data and receive user inputs associated with the sensor data via the GUI 2285. The user inputs can be provided to generate actuation signals to cause the actuation system 100 to actuate and/or perform an objective task.

It is advantageous that the mobile robot 510 and/or the actuation system 100 sense and respond to contact, possibly inadvertently, between the mobile robot 510 and/or the actuation system 100 and the environment. Measuring motor current can be advantageously used as a proxy to determine interaction forces exerted upon the mobile robot 510 and/or the actuation system 100. An efficient gear train, such as the mechanical coupling of the actuator 120 and the telescopic structure 140 via the drive mechanism 115 and the drive chain 110 of the actuation system 100, can enable interaction force to result in actuator current changes, with a greater degree of sensitivity than inefficient gear trains of traditional actuation systems. Traditional actuation systems can include brushed or rotor-less actuators, which due to the high speed of their operation require higher gear ratios. Actuation systems with lower gear ratios, such as the actuation system 100 described herein, can perform better when used in contact sensitive applications where gear rations of less than 10:1 are suitable.

The actuator 120 of the actuation system 100 can include stepper motors configured with lower gear ratios and closed loop current feedback control for wheels in the base 505 of the mobile robot 510, lift carriage 520 via actuator 705, and telescopic structure 140 via actuator 120. Stepper motors can be configured to generate high torque at low speeds, allowing lower gear ratio transmissions or gear trains to be used. The actuation system 100 can control coil current of the actuator 120 based on feedback associated with a rotor position of the actuator 120. The rotor position can be measured via a Hall effect sensor and a magnet mounted to the actuator 120. The closed loop current feedback control allows instantaneous actuator current to be determined. In some embodiments, the closed loop current feedback control can be implemented by a position and/or velocity control loop of the actuator 120 using a proportional-integral-derivative (PID) control loop mechanism.

An algorithm, implemented in non-transitory, computer-readable, executable instructions and stored in memory 2215 can be used in the actuation system 100. The algorithm can apply low pass filters to the current signal and can determine if the current of the actuator 120 exceeds a threshold value stored in the memory 2215. The current of the actuator 120 can vary in a positive or negative values from the threshold value. Traditional actuation systems can include more complex current feedback control algorithms, however, it can be advantageous to generate a binary signal from the closed loop current feedback control algorithm which is a more reliable signal that interaction forces exerted on the actuation system 100 have exceed threshold values. The binary signal can trigger new controller behavior, such as stopping, going into safety mode, or reversing direction. This ability to trigger new behaviors based on interaction forces can allow the actuation system 100 and/or the mobile robot 510 to exhibit intelligent behavior when working in unstructured environments and/or in the proximity of humans.

Figure 23:
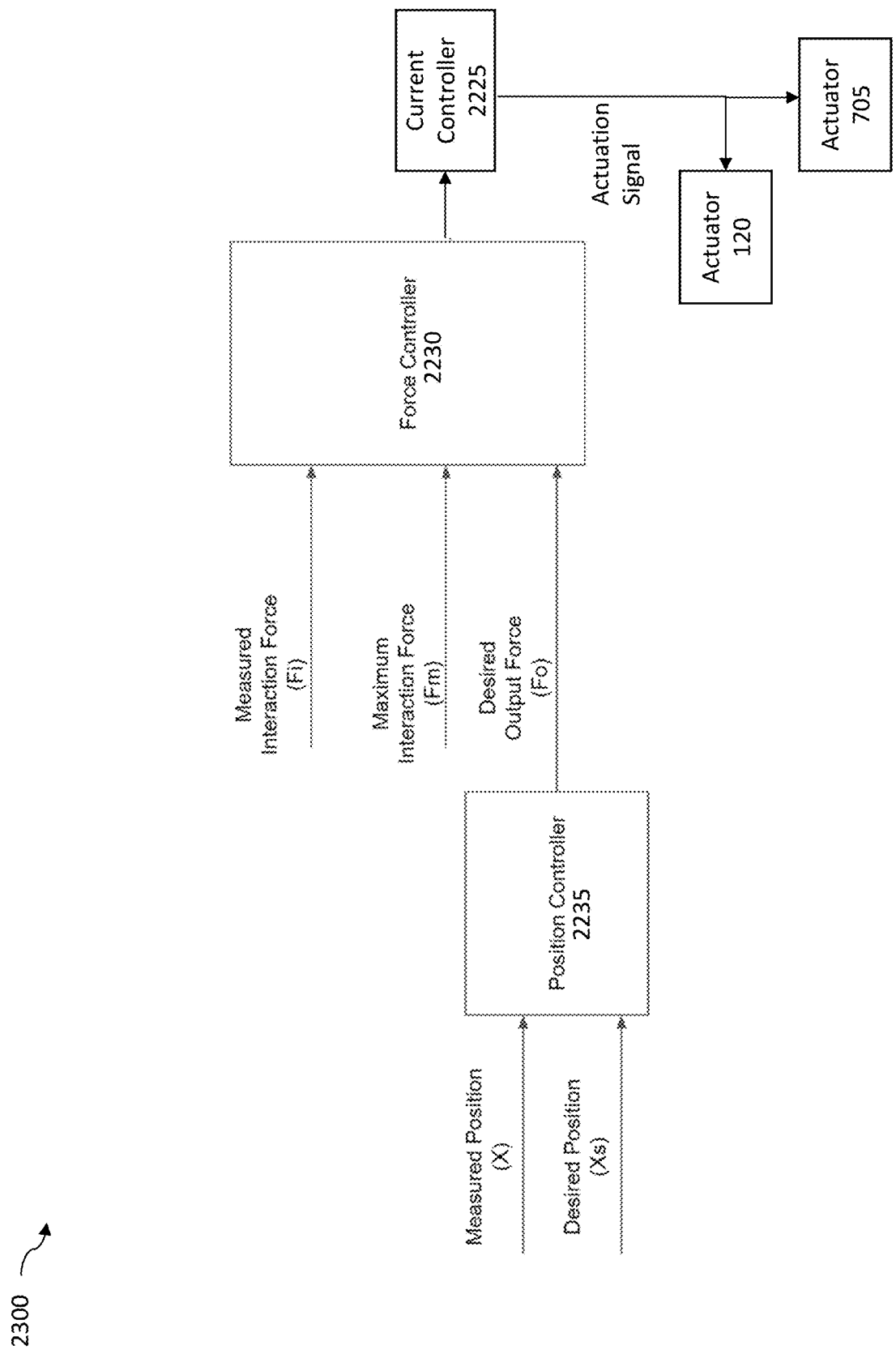
FIG. 23 is a process flow diagram illustrating an exemplary embodiment of a method for actuating a telescopic structure of the actuation system as described herein.

FIG. 23 is a data flow diagram illustrating an exemplary embodiment 2300 of actuation signal generation of the actuation system 100 as described herein. As shown in FIG. 23, a measured interaction force (Fi) can be transmitted through the telescopic structure 140 to the actuator 120. The position controller 2235 can receive a measured length (X) of the telescopic structure 140 from the encoder 2240. The measured length (X) can be received from the encoder 2240 at the time the interaction force (Fi) was exerted upon the telescopic structure 140 and a desired or objective length (Xd) of the telescopic structure 140 stored in memory 2215. The position controller 2235 can generate a desired force output (Fo) associated with a desired winding current value to provide to the force controller 2230 as an input. The force controller 2230 can further receive a measured interaction force (Fi) from force sensor 2290 and a maximum interaction force (Fm) stored in memory 2215. The force controller 2230 can process the current winding current value, the measured length (X), and their derivatives to provide an input to the current controller 2225. The current controller 2225 can then determine an actuation signal relevant to the measured interaction force (Fi) and can transmit the actuation signal to actuator 120 and/or 705.

Figure 24:
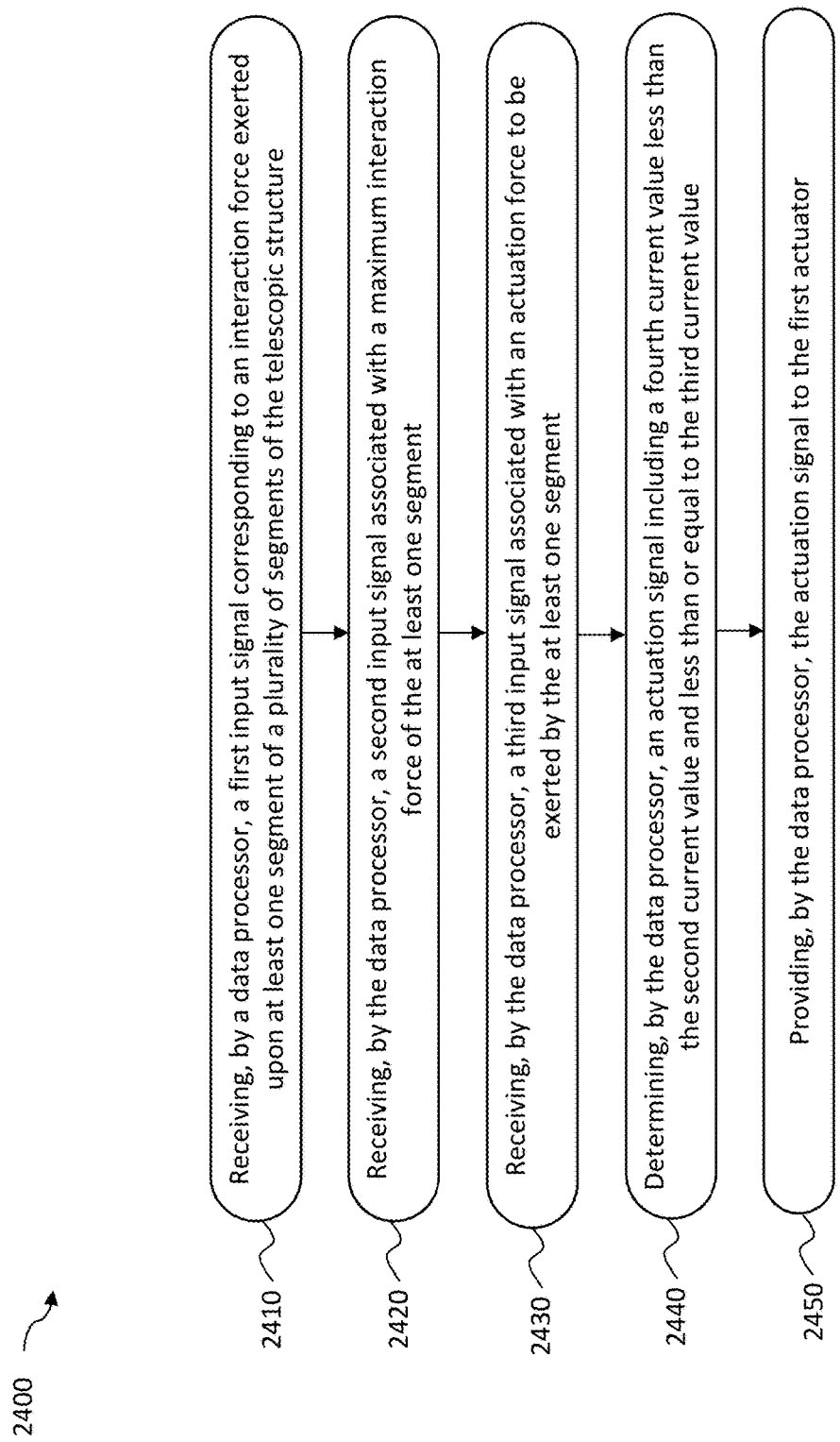
FIG. 24 is a process flow diagram illustrating an exemplary embodiment of a method for determining an actuation signal for actuating a telescopic structure of the actuation system as described herein.

FIG. 24 is a process flow diagram illustrating an exemplary embodiment of a method 2400 for actuating a telescopic structure 140 of the actuation system 100 as described herein. In operation 2410, a first signal input can be received by a data processor, such as data processor 2205. The first signal input can correspond to an interaction force (Fi) exerted upon at least one segment of a plurality of segments 145 of a telescopic structure 140. For example, the interaction force (Fi) can be received by a force sensor 2290 coupled to the telescopic structure 140. The first input can include a first current value supplied to a first actuator 120 of the actuation system 100 at a time the interaction force (Fi) was exerted upon the at least one segment. In some embodiments, the first current value can be received by a winding current sensor 2245 of the first actuator 120.

In operation 2420, the data processor 2205 can receive a second input signal associated with a maximum interaction force (Fm) of the at least one segment. The second current input can include a second current value. In some embodiments, the second input can be received programmatically, such as via memory 2215, or via user-provided input, such as via the second computing device 2225.

In operation 2430, the data processor 2205 can receive a third input signal associated with an actuation force (Fo) to be exerted by the at least one segment. The third input can include a third current value.

In operation 2440, the data processor 2205 can determine an actuation signal including a fourth current value. The fourth current value can be determined to be less than the second current value and less than or equal to the third current value. The fourth current value can cause the first actuator 120 to actuate the at least one segment to exert the actuation force (Fo). In some embodiments, the fourth current value can be a positive current value. In some embodiments, the fourth current value can be a negative current value.

In operation 2450, the data processor 2205 can provide the actuation signal to the first actuator. In some embodiments, the method can further include operating the first actuator based on the actuation signal. In some embodiments, the actuation signal can cause the drive mechanism 115 coupled to the first actuator 120 to rotate in a first direction extending the at least one segment or in a second direction, opposite to the first direction, retracing the at least one segment.

Figure 25:
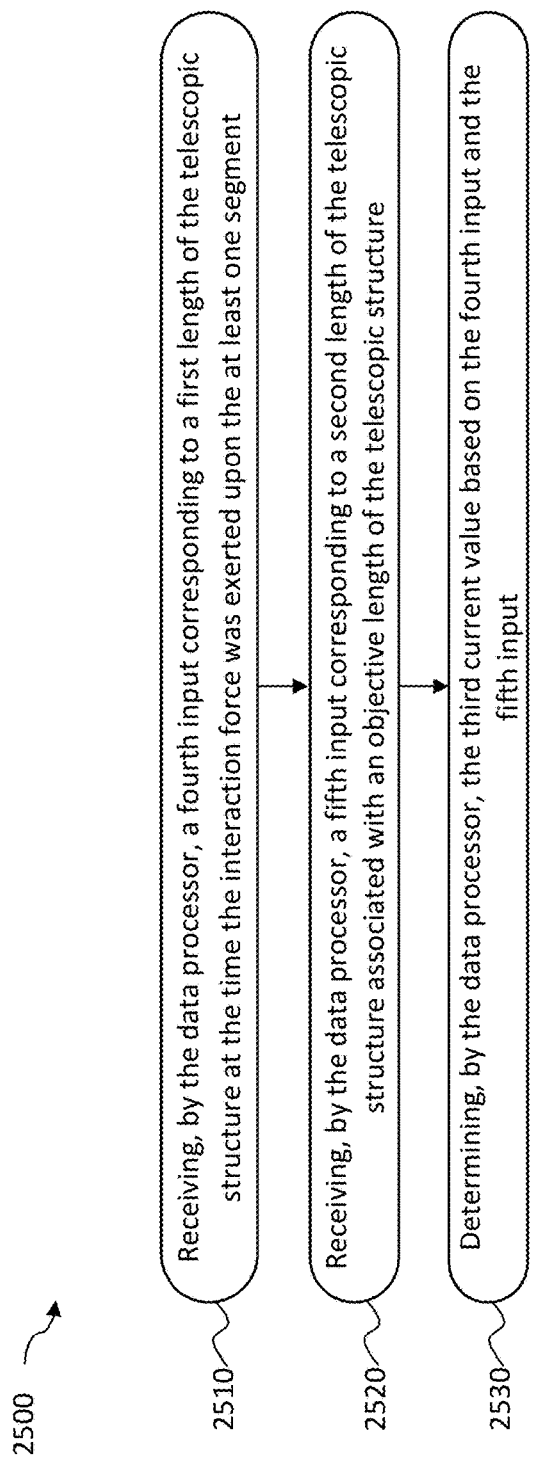
FIG. 25 is a process flow diagram illustrating an exemplary embodiment of a method for determining an actuation signal for actuating a telescopic structure of the actuation system as described herein.

FIG. 25 is a process flow diagram illustrating an exemplary embodiment of a method 2500 for determining an actuation signal for actuating a telescopic structure 140 of the actuation system 100 as described herein. In operation 2510, the data processor 2205 can receive a fourth input corresponding to a first length (X) of the telescopic structure 140 at the time the interaction force (Fi) was exerted upon the at least one segment.

In operation 2520, the data processor 2205 can receive a fifth input corresponding to a second length (Xd) of the telescopic structure 140 associated with an objective or desired length of the telescopic structure 140. In some embodiments, the fifth input can be received programmatically, such as via memory 2215, or via user-provided input, such as via the second computing device 2225. In some embodiments, the first length (X) and/or the second length (Xd) can be determined via an encoder 2240 coupled to the first actuator 120. In some embodiments, the actuation signal can cause the first actuator 120 to actuate the telescopic structure 140 to achieve the second length (Xd).

In operation 2530, the data processor 2205 can determine an updated third current value based on the fourth input and the fifth input. The updated third current value can cause the actuator 120 to actuate the telescopic structure 140 to achieve the second length (Xd).

Exemplary technical effects of the, systems and methods described herein include, by way of non-limiting example, an improved actuation system providing increased contact sensitivity in three cartesian planes and rotational directions in response to interaction forces exerted upon the actuation system. The systems and methods described herein further provide closed loop current control of actuators with low gear ratios to provide reliable and efficient actuation responses to the interaction forces.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An actuation system comprising:
a first chain cartridge including a drive chain engageably coupled to a drive mechanism actuated by a first actuator coupled to a power supply, the drive chain including a first plurality of inter-connected links conveying at least one first cable within a first interior space of each of the first plurality of inter-connected links; and
a telescopic structure including a plurality of segments configured to extend and retract telescopically with respect to one another and conveying the drive chain therein, a first end of the drive chain coupled to a distal segment of the plurality of segments, the distal segment located at a first end of the telescopic structure, wherein the drive mechanism imparts a linear translation force on the first plurality of interconnected links to cause the distal segment to extend from or retract into the first end of the telescopic structure, wherein the actuation system is coupled to a base of a mobile robot and further comprises a mast attached to the base of the mobile robot and a lift carriage coupled to the mast, the lift carriage and the telescoping structure translate vertically on the mast.

2. The actuation system of claim 1, wherein rotation of the drive mechanism in a first direction causes the drive chain to extend from within the first chain cartridge so as to actuate an extension of the telescopic structure and rotation of the drive mechanism in a second direction causes the drive chain to retract into the first chain cartridge so as to cause a retraction of the telescopic structure.

3. The actuation system of claim 1, wherein the at least one first cable includes a data cable, a power cable, or a pneumatic line.

4. The actuation system of claim 1, wherein the first chain cartridge is a self-spooling chain cartridge including a passively rotating pinion coupled to a second end of the drive chain and one or more curved guide tracks formed on an internal surface of the self-spooling chain cartridge, wherein motion of the drive mechanism causes the drive chain to spool into and unspool from the first chain cartridge.

5. The actuation system of claim 4, wherein the passively rotating pinion is affixed to the internal surface of the self-spooling chain cartridge via a retaining element and includes a slot where the first plurality of cables exit the self-spooling chain cartridge.

6. The actuation system of claim 1, wherein the lift carriage includes a plurality of lift carriage rollers.

7. The actuation system of claim 1, further comprising a second actuator in the base, the second actuator coupled to the lift carriage via at least one of a timing belt, a roller chain, or a flexible drive element, wherein the second actuator imparts vertical motion on the lift carriage.

8. The actuation system of claim 1, further comprising a second chain cartridge in the base, the second chain cartridge including a drag chain including a second plurality of inter-connected links coupled to the lift carriage and conveying at least one second cable within a second interior space of each of the second plurality of inter-connected links, wherein vertical motion of the lift carriage causes the drag chain to spool into and unspool from the second chain cartridge.

9. The actuation system of claim 8, wherein the at least one second cable includes a data cable, a power cable, or a pneumatic line.

10. The actuation system of claim 8, wherein the mast includes a channel guiding the drag chain linearly within the mast and a keeper retaining the drag chain in a rigid linear arrangement within the channel during retraction into or extension from the second chain cartridge, wherein the keeper includes at least one of a brush wiper, a rubber gland, a compliant flap or seal, a spool of metal tape, or a flexible drive element of the lift carriage.

11. The actuation system of claim 7, wherein the first actuator and first chain cartridge are located remotely from the drive mechanism in the base of the mobile robot, the first actuator coupled to the drive mechanism via a drive transmission.

12. The actuation system of claim 11, wherein the drive transmission includes a differential transmission including a first differential drive belt coupling the first actuator to the drive mechanism and a second differential drive belt coupling the second actuator to the drive mechanism, wherein concurrent motion of the first differential drive belt and the second differential drive belt in a first direction or a second direction causes the lift carriage to translate vertically on the mast, and wherein motion of the first differential drive belt in the first direction occurring concurrently with motion of the second differential drive belt in the second direction causes the telescopic structure to translate horizontally relative to a surface on which the base of the mobile robot is located, the first direction opposite the second direction.

13. The actuation system of claim 11, wherein the drive transmission includes a rotary shaft transmission including a rotary drive shaft and a right-angled gear box coupling the first actuator to the drive shaft, wherein the right-angled gear box travels along the rotary drive shaft as the lift carriage travels vertically on the mast.

14. The actuation system of claim 1, wherein the drive mechanism includes a drive chain guide retaining the drive chain radially with respect to the drive mechanism.

15. The actuation system of claim 1, wherein the distal segment of the telescopic structure is coupled to at least one manipulator payload, wherein the at least one manipulator payload includes a sensor, a tool, or a third actuator, and wherein the at least one first cable couples to the manipulator payload.

16. The actuation system of claim 1, wherein the first actuator is coupled to the drive mechanism via at least one of a timing belt, differential belt, a coupled belt, a gearbox, a spur gear, or a chain drive.

17. The actuation system of claim 1, wherein the drive chain is engageably coupled to the drive mechanism via a plurality of engagement features of the drive mechanism, the plurality of engagement features including at least one of a plurality of tooth engagement features, a plurality of cog engagement features, or a plurality of friction rollers.

18. The actuation system of claim 1, wherein each segment of the plurality of segments includes a rectangular-shaped cross-section, a curved-shaped cross-section, or a triangular-shaped cross-section, and wherein the plurality of segments are injection molded plastic segments, carbon fiber segments, extruded aluminum segments, or ultrasonically welded plastic segments.

19. The actuation system of claim 1, wherein each segment of plurality of segments of the telescopic structure includes a first plurality of rollers coupled to an outer cuff of each segment and a second plurality of rollers coupled to an inner cuff of each segment, the outer cuff located opposite the inner cuff.

20. The actuation system of claim 19, wherein the inner cuff of each segment includes a drive chain guide inserted into the inner cuff, the drive chain guide including an opening configured to align the first plurality of inter-connected links within the plurality of segments in parallel with a telescopic axis of the telescopic structure along which the plurality of segments telescopically travel.

21. The actuation system of claim 1, wherein a first segment of the plurality of segments of the telescopic structure includes an extension limiter preventing hyperextension of the first segment with respect to a second segment, wherein the first segment is configured to extend from within the second segment.

22. A method for actuating an actuation system, the method comprising:
receiving, by a data processor of an actuation system, a first input corresponding to an interaction force exerted upon at least one segment of a plurality of segments of a telescopic structure of the actuation system, the first input including a first current value supplied to a first actuator of the actuation system at a time the interaction force was exerted upon the at least one segment;
receiving, by the data processor, a second input associated with a maximum interaction force of the at least one segment, the second input including a second current value;
receiving, by the data processor, a third input associated with an actuation force (Fo) to be exerted by the at least one segment, the third input including a third current value;
determining, by the data processor, an actuation signal including a fourth current value less than the second current value and less than or equal to the third current value, the fourth current value causing the first actuator to actuate the at least one segment to exert the actuation force; and
providing, by the data processor, the actuation signal to the first actuator.

23. The method of claim 22, wherein the first current value is received from a winding current sensor of the first actuator.

24. The method of claim 22, wherein the interaction force is received by a force sensor attached to the telescopic structure.

25. The method of claim 22, further comprising operating the first actuator based on the actuation signal.

26. The method of claim 22, further comprising:
receiving, by the data processor, a fourth input corresponding to a first length of the telescopic structure at the time the interaction force was exerted upon the at least one segment;

receiving, by the data processor, a fifth input corresponding to a second length of the telescopic structure associated with an objective length of the telescopic structure; and determining an updated third current value based on the fourth input and the fifth input, wherein the updated third current value causes the first actuator to actuate the telescopic structure to achieve the second length.

27. The method of claim 26, wherein the fifth input is received programmatically or as a user-provided input.

28. The method of claim 26, wherein the first length and the second length are determined via an encoder coupled to the first actuator.

29. The method of claim 22, wherein the actuation signal causes a drive mechanism coupled to the first actuator to rotate in a first direction extending the at least one segment or in a second direction retracting the at least one segment, the second direction opposite the first direction.

30. The method of claim 22, wherein the second input is received programmatically or as a user-provided input.

* * * * *